(12) United States Patent
Suzuki et al.

(10) Patent No.: US 9,189,485 B2
(45) Date of Patent: Nov. 17, 2015

(54) TIME-SERIES DATA DIAGNOSING/COMPRESSING METHOD

(75) Inventors: Shoji Suzuki, Tokyo (JP); Junsuke Fujiwara, Hitachinaka (JP); Hideaki Suzuki, Hitachi (JP)

(73) Assignee: HITACHI, LTD., Tokyo (JP)

( * ) Notice: Subject to any disclaimer, the term of this patent is extended or adjusted under 35 U.S.C. 154(b) by 293 days.

(21) Appl. No.: 13/643,588

(22) PCT Filed: Apr. 26, 2010

(86) PCT No.: PCT/JP2010/002968
§ 371 (c)(1),
(2), (4) Date: Dec. 14, 2012

(87) PCT Pub. No.: WO2011/135606
PCT Pub. Date: Nov. 3, 2011

(65) Prior Publication Data
US 2013/0097128 A1    Apr. 18, 2013

(51) Int. Cl.
*G06F 17/30* (2006.01)
*G05B 23/02* (2006.01)

(52) U.S. Cl.
CPC ...... *G06F 17/30067* (2013.01); *G05B 23/0264* (2013.01); *G06F 17/30371* (2013.01)

(58) Field of Classification Search
USPC ............. 707/690, 691, 693, 699, 700, 701; 714/48, 49, 52
See application file for complete search history.

(56) References Cited

U.S. PATENT DOCUMENTS

| | | | |
|---|---|---|---|
| 6,532,440 B1* | 3/2003 | Boppana et al. | 703/14 |
| 7,315,856 B2* | 1/2008 | Iulo et al. | 714/48 |
| 2008/0065932 A1* | 3/2008 | Izumiya et al. | 714/40 |

FOREIGN PATENT DOCUMENTS

| | | |
|---|---|---|
| JP | 2000-259222 | 9/2000 |
| JP | 2003-15734 | 1/2003 |
| JP | 2004-30491 | 1/2004 |
| JP | 2006-276924 | 10/2006 |
| JP | 2008-167329 | 7/2008 |

OTHER PUBLICATIONS

Suzuki et al., JP 2004-30491A, Hitachi Industries Co Ltd, Jan. 2004, 1-10.*
J Shieh et al., RACE: time series compression with rate adaptivity and error bound for sensor networks, 2004, IEEE, 124-133.*
Stephen Friedenthal, GE Proficy Historian Data Compression, EVSystems www.evsystems.netsfriedenthal@evsystems.net, Oct. 26, 2012.
Swinging Door Compression, OSI Software, Inc Apr. 1991.
D3-Vector Quantization, Department of Mathematical Engineering and Information Physics, School of Engineering, The University of Tokyo, Oct. 26, 2012.
Nagata et al, Multi-Variable Analysis Method, pp. 174-185, Chapter 12 Cluster Analysis), Oct. 26, 2012.

* cited by examiner

*Primary Examiner* — Jean B Fleurantin
(74) *Attorney, Agent, or Firm* — Baker Botts L.L.P.

(57) ABSTRACT

A predicted-failure-evidence diagnosing section for equipment that does not depend on the equipment and does not require knowledge of the equipment is provided. On the basis of a result of a predicted-abnormality-evidence diagnosis carried out by this section on time-series data gathered from the equipment, an allowable error used for compressing the gathered data can be set and managed in order to compress the data if the result of the diagnosis is normal or to restrict the compression of the data during a period in which an evidence of a predicted abnormality is detected. Thus, the amount of data stored in a memory can be reduced.

8 Claims, 12 Drawing Sheets

ORIGINAL-DATA STORING BUFFER

| TIME | FIRST SENSOR | SECOND SENSOR | ... | NTH SENSOR |
|---|---|---|---|---|
| t0 | v10 | v20 | ... | vn0 |
| t1 | v11 | v21 | ... | vn1 |
| t2 | v12 | v22 | ... | vn2 |
| t3 | v13 | v23 | ... | vn3 |
| t4 | v14 | v24 | ... | vn4 |
| t5 | v15 | v25 | ... | vn5 |
| t6 | v16 | v26 | ... | vn6 |
| t7 | v17 | v27 | ... | vn7 |
| t8 | v18 | v28 | ... | vn8 |
| t9 | v19 | v29 | ... | vn9 |
| ⋮ | ⋮ | ⋮ | ⋮ | ⋮ |
| tm | v1m | v2m | ... | vnm |

COMPRESSED-DATA STORING BUFFER

| TIME | FIRST SENSOR | SECOND SENSOR | ... | NTH SENSOR |
|------|--------------|---------------|-----|------------|
| t0 | v10 | v20 | ... | vn0 |
| t1 | v11 | null | ... | vn1 |
| t2 | null | null | ... | vn2 |
| t3 | null | null | ... | vn3 |
| t4 | null | null | ... | null |
| t5 | null | v25 | ... | null |
| t6 | v16 | v26 | ... | vn6 |
| t7 | v17 | v27 | ... | null |
| t8 | v18 | v28 | ... | null |
| t9 | v19 | v29 | ... | vn9 |
| ⋮ | ⋮ | ⋮ | ⋮ | ⋮ |
| tm | v1m | v2m | ... | vnm |

FIG.9

COMPRESSED-DATA STORING BUFFER

| TIME | FIRST SENSOR | SECOND SENSOR | ... | NTH SENSOR |
|---|---|---|---|---|
| t0 | v10 | v20 | ... | vn0 |
| t1 | v11 | null | ... | vn1 |
| t2 | null | null | ... | vn2 |
| t3 | null | null | ... | vn3 |
| t4 | null | null | ... | null |
| t5 | v15 | v25 | ... | vn5 |
| t6 | v16 | v26 | ... | vn6 |
| t7 | v17 | v27 | ... | vn7 |
| t8 | v18 | v28 | ... | vn8 |
| t9 | v19 | v29 | ... | vn9 |
| ⋮ | ⋮ | ⋮ | ⋮ | ⋮ |
| tm | v1m | v2m | ... | vnm |

$t_e \rightarrow$ t5

FIG.10

COMPRESSED-DATA STORING BUFFER

| TIME | FIRST SENSOR | SECOND SENSOR | ... | NTH SENSOR |
|---|---|---|---|---|
| t0 | v10 | v20 | ... | vn0 |
| t1 | v11 | null | ... | vn1 |
| t2 | null | null | ... | vn2 |
| t3 | v13 | v23 | ... | vn3 |
| t4 | v14 | v24 | ... | vn4 |
| t5 | v15 | v25 | ... | vn5 |
| t6 | v16 | v26 | ... | vn6 |
| t7 | v17 | v27 | ... | vn7 |
| t8 | v18 | v28 | ... | vn8 |
| t9 | v19 | v29 | ... | vn9 |
| ⋮ | ⋮ | ⋮ | ⋮ | ⋮ |
| tm | v1m | v2m | ... | vnm |

$t_e - t_p \rightarrow$ t3, $t_p$, $t_e \rightarrow$ t5

FIG.11
COMPRESSED-DATA STORING BUFFER

| TIME | FIRST SENSOR | SECOND SENSOR | ... | NTH SENSOR |
|---|---|---|---|---|
| t0 | v10 | v20 | ... | vn0 |
| t1 | v11 | null | ... | vn1 |
| t2 | null | null | ... | vn2 |
| t3 | null | null | ... | vn3 |
| t4 | null | null | ... | null |
| t5 | v15 | v25 | ... | null |
| t6 | v16 | v26 | ... | vn6 |
| t7 | v17 | v27 | ... | null |
| t8 | v18 | v28 | ... | null |
| t9 | v19 | v29 | ... | vn9 |
| ⋮ | ⋮ | ⋮ | ⋮ | ⋮ |
| tm | v1m | v2m | ... | vnm |

$t_e \rightarrow$ t5

FIG.12
PREDICTED-FAILURE-EVIDENCE DIAGNOSIS IMPLEMENTATION HISTORY STORING SECTION

| TIME | EQUIPMENT ABNORMALITY DEGREE | ABNORMALITY CONTRIBUTION DEGREE | | | |
|---|---|---|---|---|---|
| | | FIRST SENSOR | SECOND SENSOR | ... | NTH SENSOR |
| t0 | d0 | r10 | r20 | ... | rn0 |
| t1 | d1 | r11 | r21 | ... | rn1 |
| t2 | d2 | r12 | r22 | ... | rn2 |
| t3 | d3 | r13 | r23 | ... | rn3 |
| t4 | d4 | r14 | r24 | ... | rn4 |
| t5 | d5 | r15 | r25 | ... | rn5 |
| t6 | d6 | r16 | r26 | ... | rn6 |
| t7 | d7 | r17 | r27 | ... | rn7 |
| t8 | d8 | r18 | r28 | ... | rn8 |
| t9 | d9 | r19 | r29 | ... | rn9 |
| ⋮ | ⋮ | ⋮ | ⋮ | ⋮ | ⋮ |
| tm | dm | r1m | r2m | ... | rnm |

FIG.13

COMPRESSION-STRATEGY HISTORY STORING SECTION

| TIME | ALLOWABLE ERROR |
|------|-----------------|
| t0   | m0              |
| t1   | m1              |
| t2   | m2              |
| t3   | m3              |
| t4   | m4              |
| t5   | m5              |
| t6   | m6              |
| t7   | m7              |
| t8   | m8              |
| t9   | m9              |
| ⋮    | ⋮               |
| tm   | mm              |

FIG.14

COMPRESSION-STRATEGY HISTORY STORING SECTION

| TIME | ALLOWABLE ERROR | | | |
|------|-----------------|----------------|-----|----------------|
|      | FIRST SENSOR    | SECOND SENSOR  | ... | NTH SENSOR     |
| t0   | m10             | m20            | ... | mn0            |
| t1   | m11             | m21            | ... | mn1            |
| t2   | m12             | m22            | ... | mn2            |
| t3   | m13             | m23            | ... | mn3            |
| t4   | m14             | m24            | ... | mn4            |
| t5   | m15             | m25            | ... | mn5            |
| t6   | m16             | m26            | ... | mn6            |
| t7   | m17             | m27            | ... | mn7            |
| t8   | m18             | m28            | ... | mn8            |
| t9   | m19             | m29            | ... | mn9            |
| ⋮    | ⋮               | ⋮              | ⋮   | ⋮              |
| tm   | m1m             | m2m            | ... | mnm            |

FIG.17
PREDICTED-FAILURE-EVIDENCE DIAGNOSIS IMPLEMENTATION HISTORY STORING SECTION

| TIME | ERROR | EQUIPMENT ABNORMALITY DEGREE | | ABNORMALITY CONTRIBUTION DEGREE | | | | | | |
|---|---|---|---|---|---|---|---|---|---|---|
| | | | | FIRST SENSOR | | SECOND SENSOR | | ... | NTH SENSOR | |
| | | ORIGINAL DATA | COMPRESSED DATA | ORIGINAL DATA | COMPRESSED DATA | ORIGINAL DATA | COMPRESSED DATA | ... | ORIGINAL DATA | COMPRESSED DATA |
| t0 | e0 | d0 | d0' | r10 | r10' | r20 | r20' | ... | rn0 | rn0' |
| t1 | e1 | d1 | d1' | r11 | r11' | r21 | r21' | ... | rn1 | rn1' |
| t2 | e2 | d2 | d2' | r12 | r12' | r22 | r22' | ... | rn2 | rn2' |
| t3 | e3 | d3 | d3' | r13 | r13' | r23 | r23' | ... | rn3 | rn3' |
| t4 | e4 | d4 | d4' | r14 | r14' | r24 | r24' | ... | rn4 | rn4' |
| t5 | e5 | d5 | d5' | r15 | r15' | r25 | r25' | ... | rn5 | rn5' |
| t6 | e6 | d6 | d6' | r16 | r16' | r26 | r26' | ... | rn6 | rn6' |
| t7 | e7 | d7 | d7' | r17 | r17' | r27 | r27' | ... | rn7 | rn7' |
| t8 | e8 | d8 | d8' | r18 | r18' | r28 | r28' | ... | rn8 | rn8' |
| t9 | e9 | d9 | d9' | r19 | r19' | r29 | r29' | ... | rn9 | rn9' |
| ⋮ | ⋮ | ⋮ | ⋮ | ⋮ | ⋮ | ⋮ | ⋮ | ⋮ | ⋮ | ⋮ |
| tm | em | dm | dm' | r1m | r1m' | r2m | r2m' | ... | rnm | rnm' |

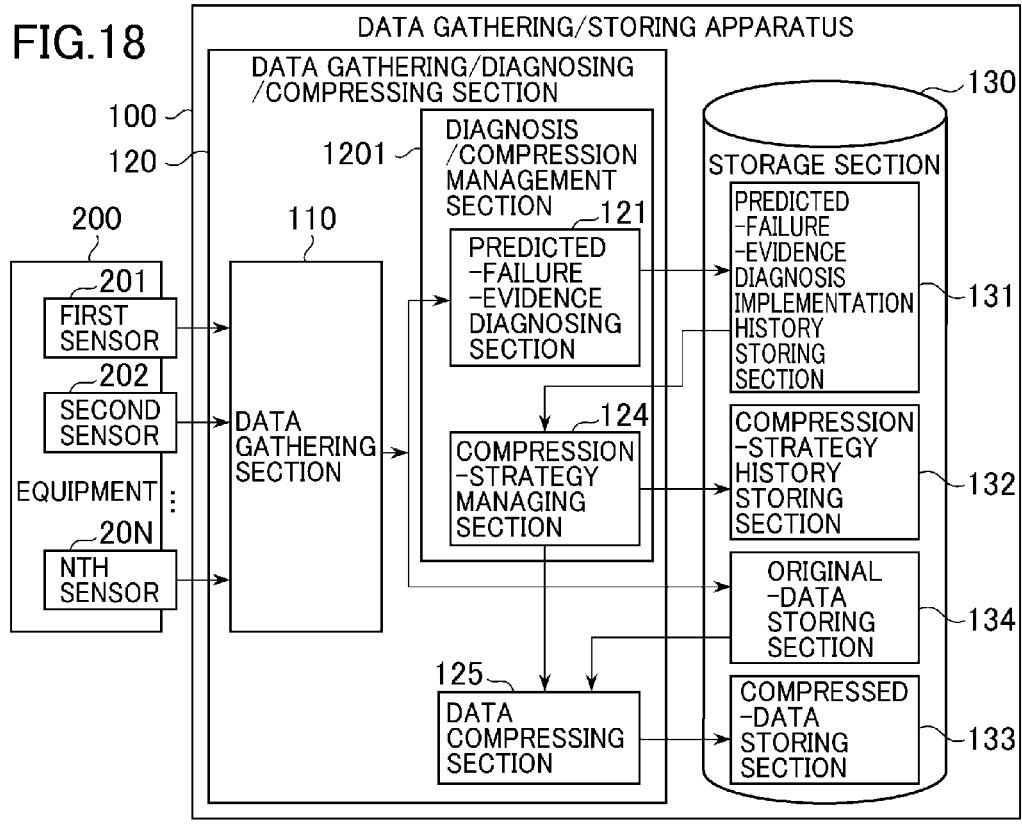

FIG.18

TIME-SERIES DATA DIAGNOSING/COMPRESSING METHOD

TECHNICAL FIELD

The present invention relates to a time-series data diagnosing/compressing method for state base maintenance services of gathering various kinds of time-series sensing information such as logging data, process data and event data from various kinds of equipment installed in plants, manufacturing apparatus used in factories, heavy machines, large-size equipment or the like and relates to a time-series data gathering/storing apparatus.

BACKGROUND OF THE INVENTION

For the purpose of a maintenance service, in a plant, operation data having an amount of several tens of thousands of points is gathered per second for every site. If operation data measured in the plant is all gathered and kept in a storage of a server as it is, data having an amount of several gigabytes is accumulated in the storage everyday.

Thus, in 2 to 3 months, a storage having a capacity of about a terabyte inevitably becomes full of data stored therein. Accordingly, there is raised a problem that, even though it is naturally desirable to provide a storage capable of accumulating data generated in several years for the purpose of a maintenance service, data gathered previously in several preceding months must be erased.

On the other hand, operation data measured by sensors installed at several hundreds of positions on a heavy machine and large-size equipment is gathered at a high speed in a short period of typically 50 milliseconds. In this case, data gathered on a day for each piece of equipment attains an amount of the order of gigabytes.

In order to render an advanced state base maintenance service in the future, it is necessary to increase the number of measurement points per site or per piece of equipment and the measurement frequency from their respective present values. In addition, it is also necessary to raise the number of sites handled by a server computer for rendering the maintenance service as well as the number of equipment pieces for the computer. It is possible to imagine that, in the near future, the amount of data kept in a server computer will be equal to a value of the order of terabytes per day and, in few years, the amount of such data will increase to a value of the order of petabytes.

Thus, instead of keeping the gathered operation data as it is, the gathered operation data is compressed or portions of the data are deleted so that it is possible to reduce the load borne in keeping the data or to decrease the amount of stored data.

In order to implement what is described above, there is provided an irreversible compression method (or a thinning method) in accordance with which, an allowable data error is set in advance and only data having errors bigger than the allowable data error is kept and stored while the remaining data is discarded.

As examples of the compression method, there have been proposed dead-band compression or change-rate compression like ones disclosed in Non-patent Document 1, swing-door compression like one disclosed in Non-patent Document 2 and compression making use of a virtual straight line like one described in Patent Document 2.

In addition, in order to adopt the above-stated compressions more effectively, there has been provided a compression method described in Patent Document 1. In accordance with this compression method, a data compression rate (or an allowable error) is not fixed at an initial set value determined at the time of designing a system. Instead, the data compression rate (or the allowable error) is changed dynamically in accordance with an abnormality (or an alarm) generated by a plant or equipment and an event such as an operation so that, at a normal time, high compression is carried out and, in the event of an abnormality, the compression rate is reduced or no compression is carried out. In this way, it is possible to prevent data required for the maintenance service from being lost and reduce the amount of stored data.

In order to render a good state base maintenance service, on the other hand, there has been provided an equipment-abnormality predicting and diagnosing technology. For example, Patent Document 3 describes an abnormality predicting and diagnosing technology adopting vector quantization clustering. For information on a vector quantization technology, refer to Non-patent Document 3. For information on clustering (or a cluster analysis), on the other hand, refer to Non-patent Document 4.

PRIOR ART LITERATURE

Patent Documents

Patent Document 1: JP-2003-015734-A
Patent Document 2: JP-2008-167329-A
Patent Document 3: JP-2006-276924-A

Non-patent Documents

Non-patent Document 1: GE Proficy Historian Data Compression Introduction, EVSystems Corporation
Non-patent Document 2: Swinging Door Compression, OSIsoft LLC
Non-patent Document 3: 'D3-Vector Quantization,' Department of Mathematical Engineering and Information Physics, School of Engineering, The University of Tokyo, Applied Acoustics, SAGAYAMA Shigeki et al.
Non-patent Document 4: 'Multi-Variable Analysis Method,' SAIENSU-SHA Co. Ltd., co-authored by NAGATA Yasushi and MUNECHIKA Masahiko, pp 174-185 (Chapter 12 Cluster Analysis)

SUMMARY OF THE INVENTION

Problems to be Solved by the Invention

In accordance with a conventional technology, an allowable error of gathered operation data of equipment is not fixed at an initial set value determined at the time of designing a system. Instead, the allowable error is changed dynamically in accordance with an abnormality (or an alarm) generated by a plant or equipment and an event such as an operation so that, at a normal time, high compression is carried out and, in the event of an abnormality, the compression rate is reduced or no compression is carried out. In this way, it is possible to prevent data required for a maintenance service from being lost and reduce the amount of stored data.

In order to set an allowable error proper for every event, however, knowledge of the equipment is required so that the allowable errors are not easy to set.

In addition, a report of an abnormality (alarm) event means that, at a point of time at which the event is reported, some abnormalities have already been generated in the equipment. Thus, a countermeasure taking the occurrence of an abnormality as a trigger is too late for good state base maintenance. That is to say, a countermeasure based on early detection of an evidence of a predicted abnormality is important. In this case, the evidence is the condition deviated from a normal condition of equipment before the occurrence of the abnormality.

For this reason, it is necessary to prevent data gathered in a detection period from being thinned by compression. The detection period is a period in which an evidence of a predicted abnormality is detected before the occurrence of the abnormality. In addition, for event setting itself, knowledge of the equipment is required from the beginning so that the setting is not easy.

On top of that, in accordance with the conventional technologies, no operation is carried out to verify whether or not the set allowable error is proper. Thus, the thinning accompanying data compression gives rise to a risk that data required for detection of an evidence of a predicted abnormality is lost.

In implementing efficient data gathering by reducing the amount of gathered/kept data without losing information required for detecting an evidence of a predicted abnormality occurring in the equipment serving as a source of data as described above, problems to be solved by the present invention can be summarized as follows.

1: Setting an allowable error for time-series data compression which can be adapted to various kinds of equipment without requiring knowledge of the equipment.
2: Preventing data from being lost not only in the event of a generated abnormality, but also in a period in which an evidence of a predicted abnormality is detected.
3: Verifying the properness of the set allowable error.

It is thus an object of the present invention to solve at least one of the problems described above.

Means for Solving the Problems

In order to solve the problems described above, the present invention provides means for setting an allowable error by diagnosing the data for an evidence of a predicted abnormality and making use of a result of the diagnosis.

To put it concretely, a clustering technology making use of vector quantization is applied to a predicted-abnormality-evidence diagnosis. Input data at normal times of equipment is mechanically learned by carrying out a multi-variable analysis. An evidence of a predicted abnormality is detected by finding the degree of diremption of input data at a diagnosis time from that at normal times. An allowable error is set and managed by making use of a result of the detection without knowledge of the equipment required with the conventional technologies. Therefore, it can avoid a predicted-abnormality-evidence detection leak caused by insufficient knowledge of the equipment. Also, problem 1 described above can be solved.

In addition, by invalidating data compression carried out during a period in which an evidence of a predicted abnormality is detected through a predicted-abnormality-evidence diagnosis, or by setting an allowable error at 0, data of the period can be prevented from being lost in order to solve problem 2 and, moreover, properness of the allowable error can be verified in order to solve problem 3.

Effects of the Invention

In accordance with the present invention, since compression of time-series data gathered from equipment is managed on the basis of results of a diagnosis adopting a general predicted-abnormality-evidence diagnosing technology not depending on the equipment, knowledge of the equipment is not required and data compression/storing can be easily implemented for various kinds of equipment.

In addition, by limiting the data compression carried out during a period in which an evidence of a predicted abnormality is detected, the amount of stored data can be reduced with a high degree of efficiency without losing data/information required in a state base maintenance service of the equipment serving as a data/information source.

BRIEF DESCRIPTION OF THE DRAWINGS

FIG. 9 is a diagram showing a second typical compressed-data storing section.

FIG. 10 is a diagram showing a third typical compressed-data storing section.

FIG. 11 is a diagram showing a fourth typical compressed-data storing section.

FIG. 12 is a diagram showing a configuration of a section used for storing a history of predicted-abnormality-evidence diagnosis implementation.

FIG. 13 is a diagram showing a first configuration of a compression-strategy history storing section.

FIG. 14 is a diagram showing a second configuration of the compression-strategy history storing section.

FIG. 17 is a diagram showing a configuration of a section used for storing a history of predicted-abnormality-evidence diagnosis implementation in accordance with the second embodiment.

FIG. 18 is a diagram showing a configuration of a data gathering/storing apparatus for carrying out data compression after data storing in accordance with a third embodiment.

MODE FOR CARRYING OUT THE INVENTION

Embodiments of the present invention are explained by referring to the diagrams as follows.

First Embodiment

Basic Configuration of Apparatus

Figures 1, 2:
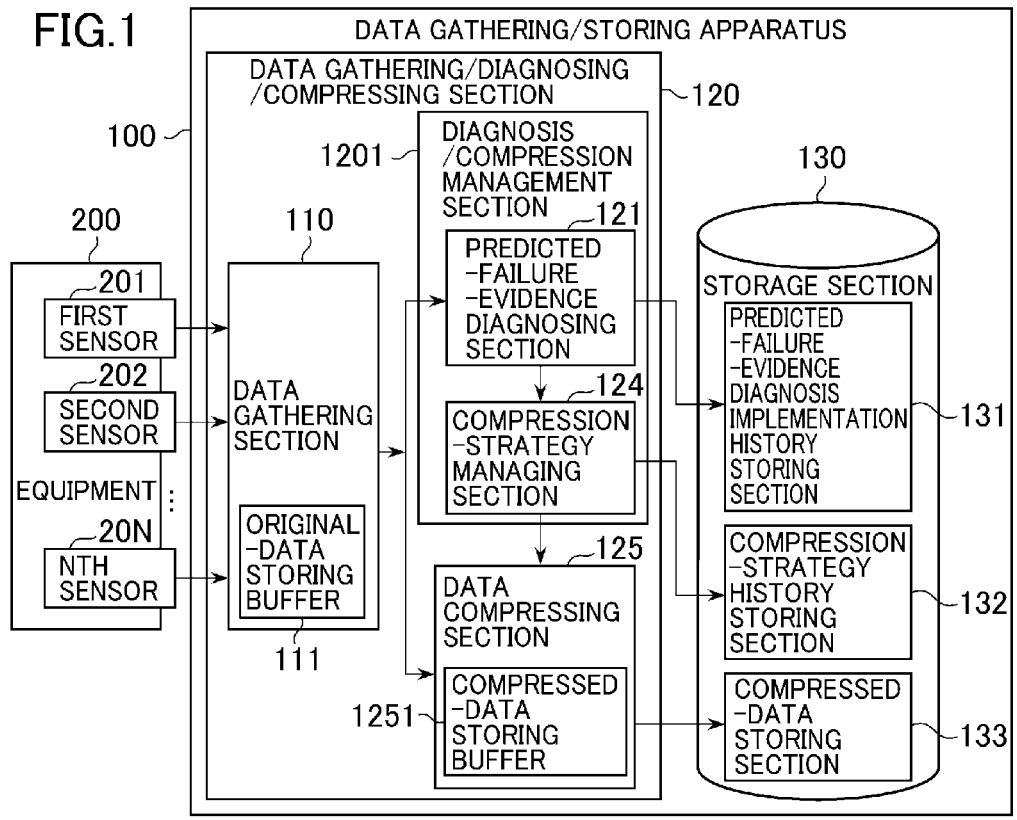
FIG. 1 is a diagram showing a configuration of a data gathering/storing apparatus.
FIG. 2 is a diagram showing a configuration of an original-data storing buffer.

FIG. 1 is a diagram showing a basic configuration of a data gathering/storing apparatus according to a first embodiment.

A data gathering/storing apparatus 100 shown in FIG. 1 is configured to include a data gathering/diagnosing/compressing section 120 and a storage section 130. The data gathering/diagnosing/compressing section 120 is configured to include a data gathering section 110, a diagnosis/compression management section 1201 and a data compressing section 125.

The data gathering section 110 has an original-data storing buffer 111. The diagnosis/compression management section 1201 is configured to include a predicted-failure-evidence diagnosing section 121 and a compression-strategy managing section 124. The data compressing section 125 has a compressed-data storing buffer 1251.

The storage section 130 is configured to include a predicted-failure-evidence diagnosis implementation history storing section 131, a compression-strategy history storing section 132 and a compressed-data storing section 133. The storage section 130 is configured as data bases and files. The data bases and the files are stored in a hard-disk drive or a non-volatile memory.

Equipment 200 includes a first sensor, a second sensor, - - - and an nth sensor which are denoted by reference numerals 201, 202, - - - and 20n respectively where the character n in reference notation 20n is a positive integer. Time-series sensing information group detected by these sensors is supplied to the data gathering/storing apparatus 100 as input data.

The data gathering section 110 gathers time-series input data received from the first sensor 201, the second sensor 202, - - - and the nth sensor 20n and stores the input data in the original-data storing buffer 111. The input data stored in the original-data storing buffer 111 is sequentially delivered to the predicted-failure-evidence diagnosing section 121 and the data compressing section 125.

In the predicted-failure-evidence diagnosing section 121, the input data is diagnosed for an evidence of a predicted abnormality. A result of the diagnosis is supplied to the compression-strategy managing section 124. On the basis of the diagnosis result received from the predicted-failure-evidence diagnosing section 121, the compression-strategy managing section 124 sets a compression strategy for the data compressing section 125.

On the other hand, the data compressing section 125 compresses the input data received from the data gathering section 110 in accordance with the compression strategy set by the compression-strategy managing section 124 and temporarily stores the compressed data in the compressed-data storing buffer 1251.

In accordance with the compression strategy set by the compression-strategy managing section 124, the data stored in the compressed-data storing section 133 can be the compressed data stored in the compressed-data storing buffer 1251 or the uncompressed original data stored in the original-data storing buffer 111 as will be described in detail later.

In addition, the predicted-failure-evidence diagnosing section 121 also outputs the result of the diagnosis to the predicted-failure-evidence diagnosis implementation history storing section 131 used for storing the result, whereas the compression-strategy managing section 124 outputs an allowable error to the compression-strategy history storing section 132 used for storing the error.

The input data supplied to the data gathering/storing apparatus 100 from the single equipment 200 as described above is information generated by the sensors 201, 202, - - - and 20n included in the equipment 200. It is to be noted, however, that the equipment may also be configured from a plurality of pieces of equipment. In addition, the information serving as the input data can also be information other than information generated by the main unit of the equipment 200 or various kinds of logging data. An example of the information other than the information generated by the main unit of the equipment 200 is sensing information of peripheral equipment or a pipe arrangement section whereas an example of the logging data is sensing information of surrounding-environment information. In addition, the information serving as the input data can also be process data or event data. On top of that, the input data does not have to be information generated by sensors. For example, the input data can also be information output by other monitoring control apparatus.

It is to be noted that the logging data is various kinds of sensor information gathered periodically. The sensor information includes information required for controlling the operation of the equipment, information on an operation-time state of the equipment and information on the environment surrounding a place at which the equipment is installed. Examples of the information required for controlling the operation of the equipment are a rotational speed and the position of the equipment. Examples of the information on an operation-time state of the equipment are a water temperature and information on the vibration of the equipment. Examples of the information on the environment are the ambient temperature and the humidity.

The process data is a set of data added through a sequence of job processes by typically recording (and, in some cases, correcting) the data at the end of every task.

The event data is information such as an equipment operation or an equipment alarm.

<Original-Data Storage Buffer>

FIG. 2 is a diagram showing a configuration of the original-data storage buffer 111.

The input data supplied by the sensors employed in the equipment 200 is stored in the original-data storing buffer 111 to form a set in conjunction with a measurement time. As described above, the sensors employed in the equipment 200 are the first sensor, the second sensor, - - - and the nth sensor which are denoted by reference numerals 201, 202, - - - and 20n respectively where the character n in reference notation 20n is a positive integer. The input data is various kinds of time-series sensing information such as the logging data, the process data and the event data.

That is to say, measurement data v1i output by the first sensor, measurement data v2i output by the second sensor, - - - and measurement data vni output by the nth sensor form a set in conjunction with a measurement time ti where the suffix i denotes an integer in a range of 0 to m. This set is stored on a time-series column in the original-data storing buffer 111.

The original-data storing buffer 111 is configured as typically a ring buffer. As the ring buffer becomes full of input data stored therein, new input data is stored in the buffer sequentially over the least recent input data.

<Predicted-Failure-Evidence Diagnosing Section>

Operations carried out by the predicted-failure-evidence diagnosing section 121 are explained by referring to FIGS. 3, 4 and 5 as follows.

In this case, a diagnosis for an evidence of a predicted abnormality is carried out by making use of a vector quantization clustering technology. The vector quantization clustering technology is described in detail in Non-patent Document 3. In addition, clustering (or a clustering analysis) is described in detail in Non-patent Document 4. On the other hand, the predicted-abnormality-evidence diagnosis carried out by making use of the vector quantization clustering technology is disclosed in Patent Document 3.

Figure 3:
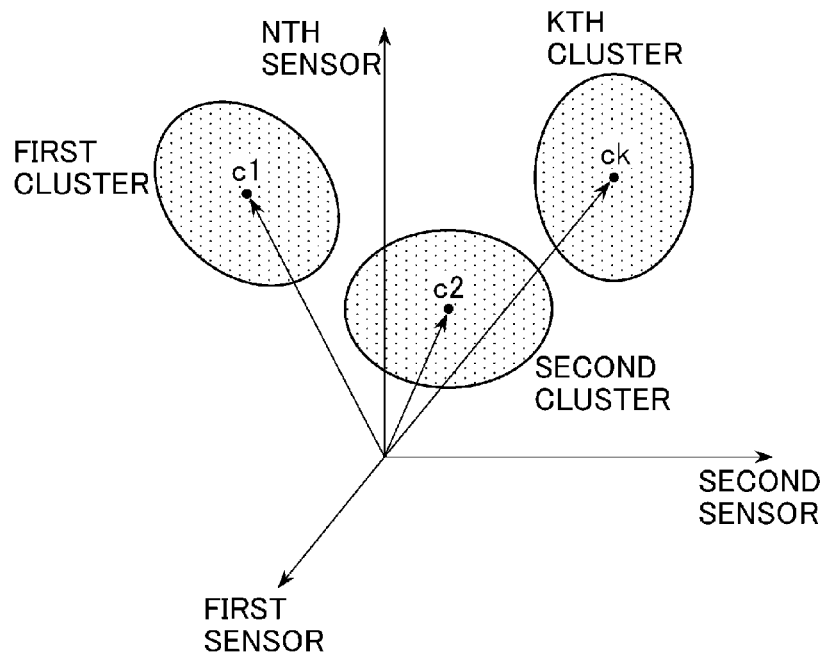
FIG. 3 is a diagram to be referred to in explanation of cluster creation based on vector quantization and carried out at a normal time by a predicted-abnormality-evidence diagnosing section.

FIG. 3 is a diagram referred to in the following explanation of cluster creation based on vector quantization and carried out at a normal time by the predicted-abnormality-evidence diagnosing section.

The cluster creation based on vector quantization and carried out at a normal time by the predicted-failure-evidence diagnosing section 121 is explained by referring to FIG. 3 as follows.

FIG. 3 simply shows an n-dimensional space in which every axis represents measurement data output by a sensor. Separately, clustering is carried out by making use of a large number of input-data vectors as learning data and the center of gravity of every cluster is obtained. The input-data vector is the vector of input data which is collected when the equipment 200 is operating normally. The input-data vectors are expressed by (v1i, v2i, - - - and vni where the suffix i denotes an integer).

FIG. 3 shows the state of a space classified into k clusters each having a hyper-spherical shape as a result of the clustering of the learning data. The space is a space in which the input-data vectors received at normal times are distributed. In the figure, the k clusters are shown as cluster 1, cluster 2, - - - and cluster k whereas the centers of gravity of the cluster 1, cluster 2, - - - and cluster k are shown as centers c1, c2, - - - and ck respectively.

A set of the gravity centers c1, c2, - - - and ck is formed by the group of the input-data vectors received at normal times in this way and managed by the predicted-failure-evidence diagnosing section 121 as a code book.

Figure 4:
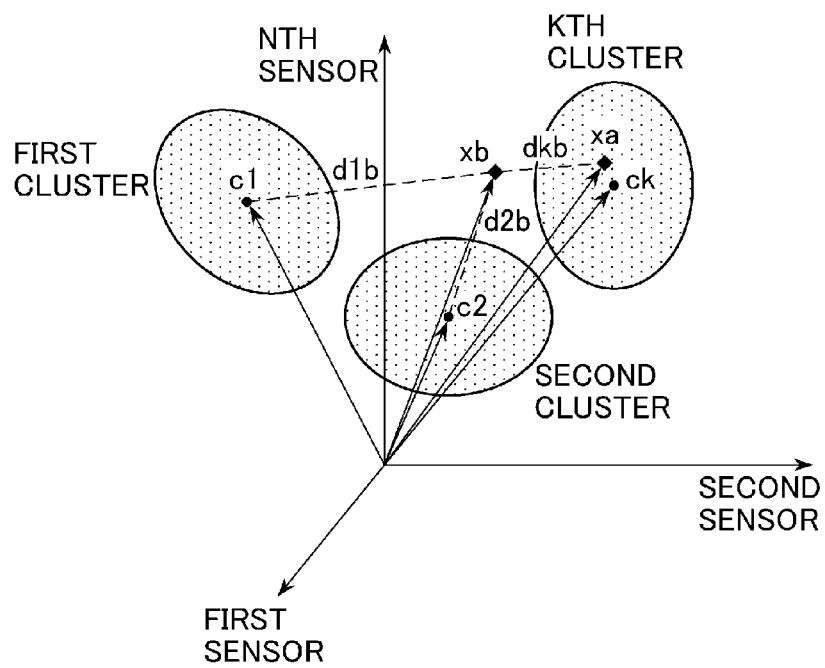
FIG. 4 is a diagram to be referred to in explanation of an abnormality detecting method making use of clusters in the predicted-abnormality-evidence diagnosing section.

FIG. 4 is a diagram referred to in the following explanation of an abnormality detecting method adopted by the predicted-abnormality-evidence diagnosing section to serve as a method making use of clusters.

The abnormality detecting method adopted by the predicted-failure-evidence diagnosing section 121 to serve as a method making use of clusters is explained by referring to FIG. 4 as follows.

The predicted-failure-evidence diagnosing section 121 computes the smallest one among the distances between the input-data vectors and the centers of gravity of the clusters and outputs the computed smallest distance as an equipment abnormality degree.

Let reference notation xa denote an input-data vector at a predicted-abnormality-evidence diagnosis time Ta whereas reference notation xb denote an input-data vector at a predicted-abnormality-evidence diagnosis time Tb. As shown in the figure, the input-data vector xa at the time Ta is included in the hyper-sphere formed by a cluster k. Thus, the input-data vector xa indicates normalcy.

On the other hand, the input-data vector xb at the time Tb is not included in any cluster. In this case, an evidence of a predicted abnormality exists. In FIG. 4, the distance dkb between the input-data vector xb and the gravity center ck of the cluster k is smallest. Thus, the distance dkb is taken as the equipment abnormality degree of the input-data vector xb.

It is to be noted that every sensing data can be normalized by making use of their standard deviation in order to typically carry out scaling conversion of Mahalanobis' distance and the like so that the shape of the cluster can be converted into the hyper-spherical shape. In addition, due to normalization, the equipment abnormality degree of 1 can be taken as a boundary face of the hyper-sphere. That is to say, an equipment abnormality degree not greater than 1 can be considered to be an equipment abnormality degree indicating normalcy whereas an equipment abnormality degree greater than 1 can be considered to be an equipment abnormality degree indicating that an evidence of a predicted abnormality has been detected. Unless otherwise described specifically, in the present invention, each of the input-data vectors v1i, v2i, - - - and vni is treated as a normalized value.

Figure 5:
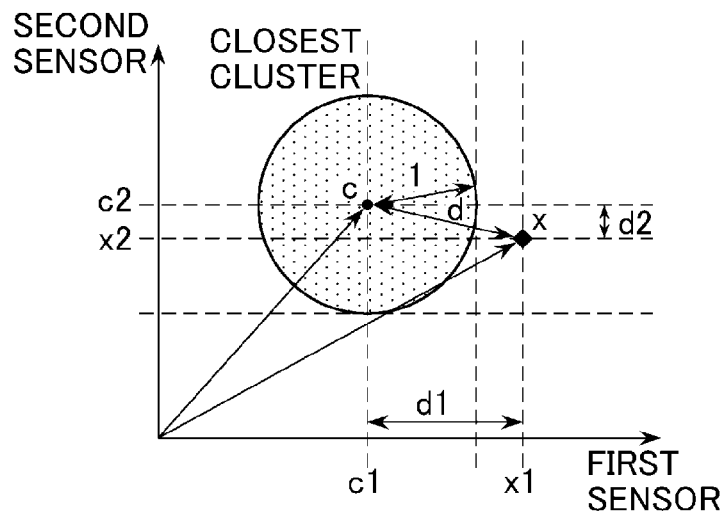
FIG. 5 is a diagram to be referred to in explanation of a method for computing an abnormality degree by making use of a cluster and a method for computing a degree of contribution of each sensor to an abnormality in the predicted-abnormality-evidence diagnosing section.

FIG. 5 is a diagram referred to in the following explanation of a method for computing an abnormality degree by making use of a cluster and a method for computing the degree of contribution of each sensor to an abnormality in the predicted-abnormality-evidence diagnosing section.

The following description concretely explains the method for computing an abnormality degree by making use of a cluster and the method for computing the degree of contribution of each sensor to an abnormality in the predicted-failure-evidence diagnosing section 121.

In order to make the explanation simple, in FIG. 5, it is assumed that the input-data vector is a 2-dimensional vector $x=(x1, x2)$ and a gravity-point vector $c=(c1, c2)$ is the gravity-point vector of the closest cluster. In this case, the distance d between the vectors x and c is expressed by Eq. 1 as follows:

$$d = \sqrt{((x1-c1)^2 + (x2-c2)^2)} = \sqrt{(d1^2 + d2^2)} \quad \text{(Eq. 1)}$$

In the above equation, reference notations d1 and d2 satisfy the following equations: $d1=|x1-c1|$ and $d2=|x2-c2|$.

In addition, the distance d is the equipment abnormality degree. FIG. 5 shows a departure of the input-data vector x from the area of the cluster c. (That is to say, the relation d>1 holds true). Thus, an evidence of a predicted abnormality has been detected.

It is to be noted that the components of the distance d can be normalized by dividing the components by the distance d. Let reference notations r1 and r2 denote the normalized components. In this case, the normalized components r1 and r2 can be used as indicators each representing the degree of contribution to the equipment abnormality.

The normalized components r1 and r2 are each referred to as an abnormality contribution degree. The normalized components r1 and r2 may be output from the predicted-failure-evidence diagnosing section 121 along with the equipment abnormality degree. The normalized components r1 and r2 are expressed by Eq. 2 as follows:

$$r1 = d1/d, r2 = d2/d \quad \text{(Eq. 2)}$$

<Effects and Restriction Avoidance>

As described above, by adopting clustering based on vector quantization, it is possible to obtain the degree of a departure from the distribution area of input data received at normal times as an equipment abnormality degree. Thus, by sequentially supplying time-series input data obtained at operation times of the equipment to the predicted-failure-evidence diagnosing section 121, an evidence of a predicted abnormality can be detected.

In accordance with this method, input data obtained at normal times from the equipment is mechanically learned by carrying out a multi-variable analysis in order to detect an evidence of a predicted abnormality. Thus, unlike the conventional technologies, knowledge of the equipment is not required. It is possible to avoid a predicted-abnormality-evidence detection leak caused by a lack of knowledge of the equipment and to apply the method to various kinds of equipment.

In addition, the load of the predicted-abnormality-evidence diagnosis depends on the dimension of the input-data vector and the total number of clusters created at a learning time. Thus, by setting each of the dimension and the total number of clusters at a sufficiently small value in a practical range, the predicted-abnormality-evidence diagnosis can be carried out at a high speed and the scale of the predicted-abnormality-evidence diagnosis can be made compact. As a result, the data gathering/storing apparatus 100 employing the predicted-failure-evidence diagnosing section 121 can be implemented in built-in equipment having restrictions imposed on the power of a CPU employed in the equipment and the size of a memory of the equipment.

It is to be noted that, as described above, in an embodiment of the predicted-failure-evidence diagnosing section 121, a cluster analysis method based on vector quantization is adopted in order to compute the degree of diremption from a cluster created by input data received at normal times and output the degree of diremption as an equipment abnormality degree.

However, the cluster analysis method adopted by the predicted-failure-evidence diagnosing section 121 does not have to be the cluster analysis method based on vector quantization. In addition, instead of adopting the cluster analysis method, the predicted-failure-evidence diagnosing section 121 may also make use of another multi-variable analysis method such as the MT method. As an alternative, if a simulator of the equipment is available, the degree of an abnormality of the equipment can also be output by making use of results generated by the simulator, <Compression-Strategy Managing Section>

Next, operations carried out by the compression-strategy managing section 124 are explained by referring to FIGS. 6 and 7 as follows.

In this case, it is assumed that the data compressing section 125 carries out irreversible compression such as the deadband compression (or the change-rate compression) described in Non-patent Document 1, the swinging-door compression described in Non-patent Document 2 or the compression making use of a virtual straight line as described in Patent Document 2.

In accordance with the equipment abnormality degree output by the predicted-failure-evidence diagnosing section 121, the compression-strategy managing section 124 sets an allowable error (or a margin) in order to change the degree of the data compression carried out by the data compressing section 125.

Figure 6:
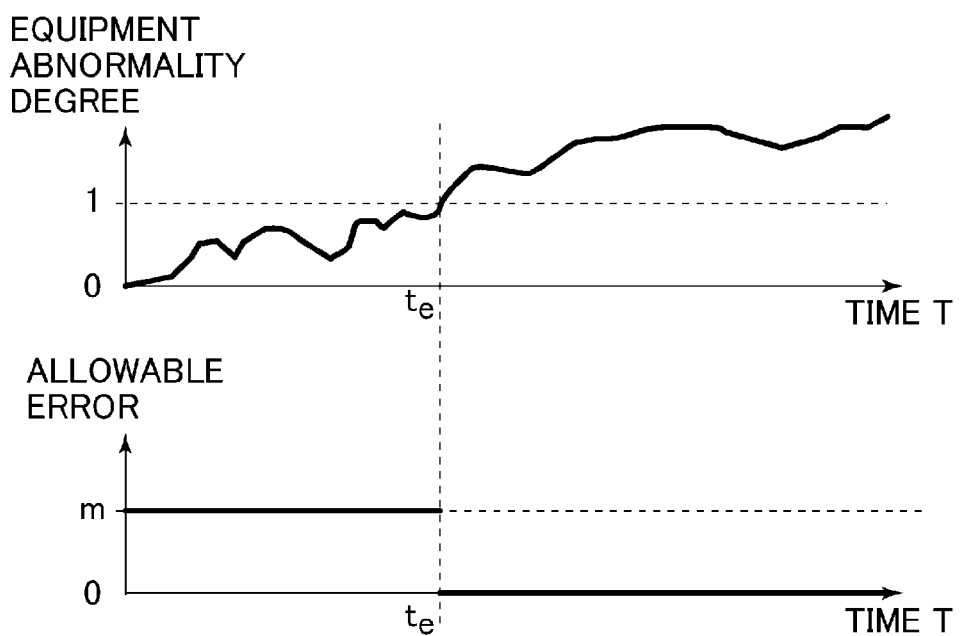
FIG. 6 is a diagram showing a first typical setting of an allowable error in a compression-strategy management section.

FIG. 6 is a diagram showing a first typical setting of the allowable error in the compression-strategy managing section. A first embodiment in the compression-strategy managing section 124 is explained by referring to FIG. 6 as follows.

The figure shows two graphs. The upper graph represents changes in equipment abnormality degree output by the predicted-failure-evidence diagnosing section 121 with the lapse of time. On the other hand, the lower graph represents the allowable error set by the compression-strategy managing section 124 to the data compressing section 125 in accordance with the equipment abnormality degree. In the embodiment shown in the figure, the allowable error is set as follows.

For the equipment abnormality degree≤1 (that is, in a normal period of time), the allowable error is set at m.

For the equipment abnormality degree>1 (that is, in a predicted-abnormality-evidence detection period of time), on the other hand, the allowable error is set at 0 (that is, no compression is carried out).

That is to say, as a result of a diagnosis carried out on the input data, in a normal period of time, the input data is compressed at an allowable error of m. In a predicted-abnormality-evidence detection period of time, on the other hand, the allowable error is set at 0, that is, no compression is carried out on the input data.

Let the allowable error m be set at m % of a maximum value that can be taken by a sensor. An example of the maximum value m % is 1%. As an alternative, the value of m can be set for every sensor individually.

Thus, the typical graphs shown in the figure represent changes at a boundary time te of the equipment abnormality degree as follows:

1: For T≤te, the equipment abnormality degree≤1. Thus, the allowable error is set at m.

2: For te<T, on the other hand, the equipment abnormality degree>1. Thus, the allowable error is set at 0.

Figures 7, 8:
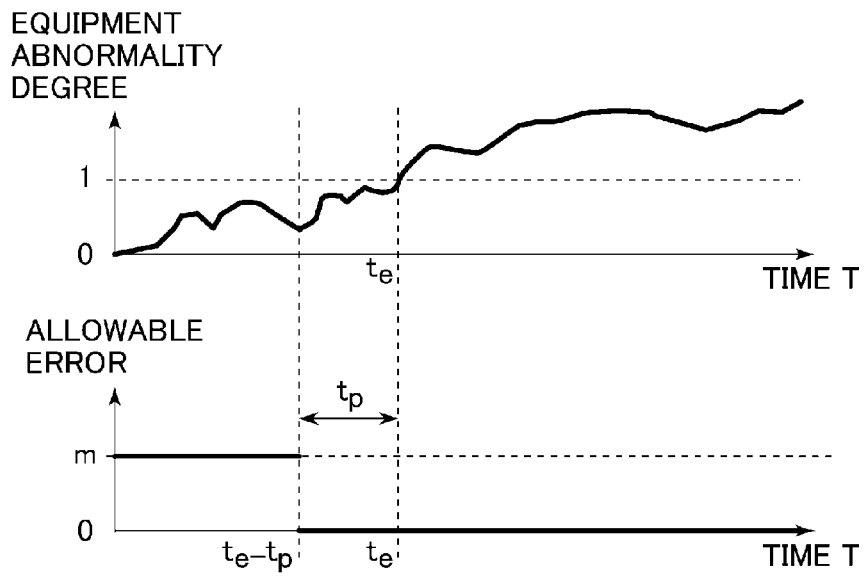
FIG. 7 is a diagram showing a second typical setting of the allowable error in the compression-strategy management section.
FIG. 8 is a diagram showing a first typical compressed-data storing section.

FIG. 7 is a diagram showing a second typical setting of the allowable error in the compression-strategy management section. A second embodiment in the compression-strategy managing section 124 is explained by referring to FIG. 7 as follows.

The upper graph shown in FIG. 7 is the same as the upper graph shown in FIG. 6. In accordance with this embodiment shown in the figure, the allowable error is set as follows:

1: For the equipment abnormality degree≤1, the allowable error is set at m.

2: For T≥(te−tp), however, the allowable error is set at 0. In this case, the time te is the boundary time at which the equipment abnormality degree exceeds 1 whereas the period tp is a retroactive period on the upstream side of the time te.

Thus, in the case of the example shown in this figure, the allowable error is set by the compression-strategy managing section 124 to the data compressing section 125 in accordance with the equipment abnormality degree as follows.

1: For T≤(te−tp), the allowable error is set at m.

2: For (te−tp)<T, on the other hand, the allowable error is set at 0.

<Restriction Avoidance>

As described above, the conversion of the equipment abnormality degree into the allowable error takes a time, at which the allowable error=1, as a boundary and, in a period before the boundary time, the allowable error is set at m whereas, in a period after the boundary time, the allowable error is set at 0. However, the allowable error can also be changed continuously in accordance with the value of the equipment abnormality degree.

Meanwhile, the input data compressed on the basis of the allowable error can be data collected by the data gathering section 110 from all kinds of sensor or data generated by only a sensor determined in advance as a diagnosis object. As an alternative, the input data can also be data generated by only a sensor having a high abnormality contribution degree or a sensor having a threshold value of at least rth. The value of rth is typically 0.4. Since the abnormality contribution degree is normalized, the abnormality contribution degree has a value in a range of 0 to 1.

Operations carried out by the compression-strategy managing section 124 have been explained so far by assuming that the data compressing section 125 carries out irreversible compression. It is to be noted, however, that the data compressing section 125 may also carry out reversible (or lossless) compression such as the zip or gz compression.

In this case, instead of setting the allowable error in accordance with the equipment abnormality degree output by the predicted-failure-evidence diagnosing section 121, the compression-strategy managing section 124 sets a compression level. For example, the following operations are conceivable. At a normal time for which the equipment abnormality degree is not greater than 1, the compression-strategy managing section 124 sets a compression level at a value for carrying out maximum compression. If an evidence of a predicted abnormality has been detected as indicated by an equipment abnormality degree greater than 1, on the other hand, the compression-strategy managing section 124 sets a compression level at 0 for carrying out no compression.

In addition, the data compressing section 125 may also carry out multi-stage compression. For example, after executing irreversible compression, the data compressing section 125 may further carry out reversible conversion.

<Compressed-Data Storing Section>

Embodiments of the compressed-data storing section 133 for storing data compressed by the data compressing section 125 are explained below by referring to FIGS. 8, 9, 10 and 11. It is to be noted that the configuration of the compressed-data storing buffer 1251 employed in the data compressing section 125 is basically identical with that of the compressed-data storing section 133.

FIG. 8 is a diagram showing a first typical compressed-data storing section.

FIG. 8 shows an embodiment of the compressed-data storing section 133 for a case in which the allowable error of each sensing data in a period between times t0 and tm is set at a fixed value m.

A hatched block denoted by the word 'null' in FIG. 8 represents data thinned by the data compressing section 125. For example, four pieces of sensing data generated by the first sensor at times t2 to t5 respectively have been thinned. By the same token, four pieces of sensing data generated by the second sensor at times t1 to t4 respectively have been thinned. Likewise, four pieces of sensing data generated by the nth sensor at times t4, t5, t7 and t8 respectively have been thinned.

FIG. 9 is a diagram showing a second typical compressed-data storing section.

In comparison with the first typical compressed-data storing section shown in FIG. 8, FIG. 9 shows an embodiment of the compressed-data storing section 133 for a case in which the compression-strategy management explained earlier by referring to FIG. 6 is adopted.

The time to shown in FIG. 6 corresponds to the time t5 shown in FIG. 9. Thus, at times after the time t5, the allowable error is set at 0 and no compression is carried out. A hatched block denoted by the word 'null' in the figure represents data thinned. In FIG. 8, one piece of sensing data generated by the first sensor at the time t5 has been thinned, three pieces of sensing data generated by the nth sensor at times t5, t7 and t8 respectively have been thinned. But, in FIG. 9, those four pieces of sensing data respectively have been stored.

FIG. 10 is a diagram showing a third typical compressed-data storing section.

In comparison with the first typical compressed-data storing section shown in FIG. 8, FIG. 10 shows an embodiment of the compressed-data storing section 133 for a case in which the compression-strategy management explained earlier by referring to FIG. 7 is adopted.

The time te shown in FIG. 7 corresponds to the time t5 shown in FIG. 10 whereas the time (te-tp) shown in FIG. 7 corresponds to a time t3 shown in FIG. 10. Thus, at times after the time t3, the allowable error is set at 0 and no compression is carried out. A hatched block denoted by the word 'null' in the figure represents data thinned. In FIG. 8, three pieces of sensing data generated by the first sensor at times t3 to t5 respectively have been thinned, two pieces of sensing data generated by the second sensor at times t3 and t4 respectively have been thinned, four pieces of sensing data generated by the nth sensor at times t4, t5, t7 and t8 respectively have been thinned. But, in FIG. 10, those nine pieces of sensing data respectively have been stored.

FIG. 11 is a diagram showing a fourth typical compressed-data storing section.

In comparison with the first typical compressed-data storing section shown in FIG. 8, FIG. 11 shows an embodiment of the compressed-data storing section 133 for a case in which only 2 sensors are taken as sensors to be diagnosed by the compression-strategy managing section 124. The 2 sensors are first and second sensors.

The sensing data generated by the first and second sensors is not thinned at the time t5 and after the time t5, in the same way as that shown in FIG. 9. However, since the nth sensor is not a sensor to be diagnosed, the sensing data generated by the nth sensor is thinned even if an evidence of a predicted abnormality has been detected, in the same way as that shown in FIG. 8.

It is to be noted that the embodiment shown in FIG. 11 also corresponds to another case in which the abnormality contribution degree of each of the first and second sensors about a predicted-abnormality-evidence detected at and after the time t5 exceeds a threshold value and the abnormality contribution degree of the nth sensor does not exceed a threshold value. Data generated by a sensor with an abnormality contribution degree not exceeding a threshold value is thinned even if an evidence of a predicted abnormality has been detected.

<Predicted-Abnormality-Evidence Diagnosis Implementation History Storing Section>

FIG. 12 is a diagram showing a configuration of the section used for storing a history of predicted-abnormality-evidence diagnosis implementation. An embodiment of the predicted-failure-evidence diagnosis implementation history storing section 131 is explained by referring to FIG. 12 as follows.

The predicted-failure-evidence diagnosis implementation history storing section 131 is used for recording sets each including the equipment abnormality degree, the abnormality contribution degrees of every sensor and the measurement time. The equipment abnormality degree is a result of the diagnosis carried out by the predicted-failure-evidence diagnosing section 121 on the time-series sensing information which is the input data.

To put it concretely, every set includes a measurement time $t_i$, an equipment abnormality degree $d_i$ and abnormality contribution degrees which are the abnormality contribution degree $r1_i$ of the first sensor, the abnormality contribution degree $r2_i$ of the second sensor, - - - and the abnormality contribution degree $rn_i$ of the nth sensor where suffix i is an integer in a range of 0 to m. The sets are stored in the predicted-failure-evidence diagnosis implementation history storing section 131 in a time-series format.

The buffer is configured as typically a ring buffer. As the ring buffer becomes full of the equipment abnormality and abnormality contribution degrees stored therein, new equipment abnormality and abnormality contribution degrees are stored in the buffer sequentially over the least recent equipment abnormality and abnormality contribution degrees.

<Effects and Restriction Avoidance>

By referring to the equipment abnormality degree of every measurement time of the predicted-failure-evidence diagnosis implementation history storing section 131, it is possible to verify whether or not the equipment 200 is normal or whether or not an evidence of a predicted abnormality has been detected. Thus, the maintenance engineer assigned to the equipment 200 is capable of carrying out a more detailed diagnosis focused on a time band in which the evidence of a predicted abnormality has been detected.

In addition, by referring to the abnormality contribution degrees of every sensor, it is possible to identify which sensor contributes to the evidence of a predicted abnormality so that an abnormal member can now be recognized with ease.

It is to be noted that each set stored in the predicted-failure-evidence diagnosis implementation history storing section 131 may also consist of a measurement time and an equipment abnormality degree only.

<Compression-Strategy History Storing Section>

FIG. 13 is a diagram showing a first configuration of the compression-strategy history storing section. An embodiment of the compression-strategy history storing section 132 is explained by referring to FIG. 13 as follows.

The compression-strategy history storing section 132 is used for recording sets each including an allowable error and a measurement time. The allowable error is a parameter used in compression of time-series sensing information which is the input data. To put it concretely, every set includes a measurement time ti and an allowable error mi where suffix is an integer in a range of 0 to m. The sets are stored in the compression-strategy history storing section 132 in a time-series format.

The buffer is configured as typically a ring buffer. As the ring buffer becomes full of the equipment abnormality and abnormality contribution degrees stored therein, new equipment abnormality and abnormality contribution degrees are stored in the buffer sequentially over the least recent equipment abnormality and abnormality contribution degrees.

FIG. 14 is a diagram showing a second configuration of the compression-strategy history storing section. Another embodiment of the compression-strategy history storing section 132 is explained by referring to FIG. 14 as follows.

The compression-strategy history storing section 132 is used for recording sets each including allowable errors of every sensor and a measurement time. The allowable error is a parameter used in compression of time-series sensing information which is the input data. To put it concretely, every set includes a measurement time ti, an allowable error m1i of the first sensor, an allowable error m2i of the second sensor, - - - and an allowable error mni of the nth sensor where suffix i is an integer in a range of 0 to m. The sets are stored in the compression-strategy history storing section 132 in a time-series format.

The buffer is configured as typically a ring buffer. As the ring buffer becomes full of the equipment abnormality and abnormality contribution degrees stored therein, new equipment abnormality and abnormality contribution degrees are stored in the buffer sequentially over the least recent equipment abnormality and abnormality contribution degrees.

Second Embodiment

Figure 15:
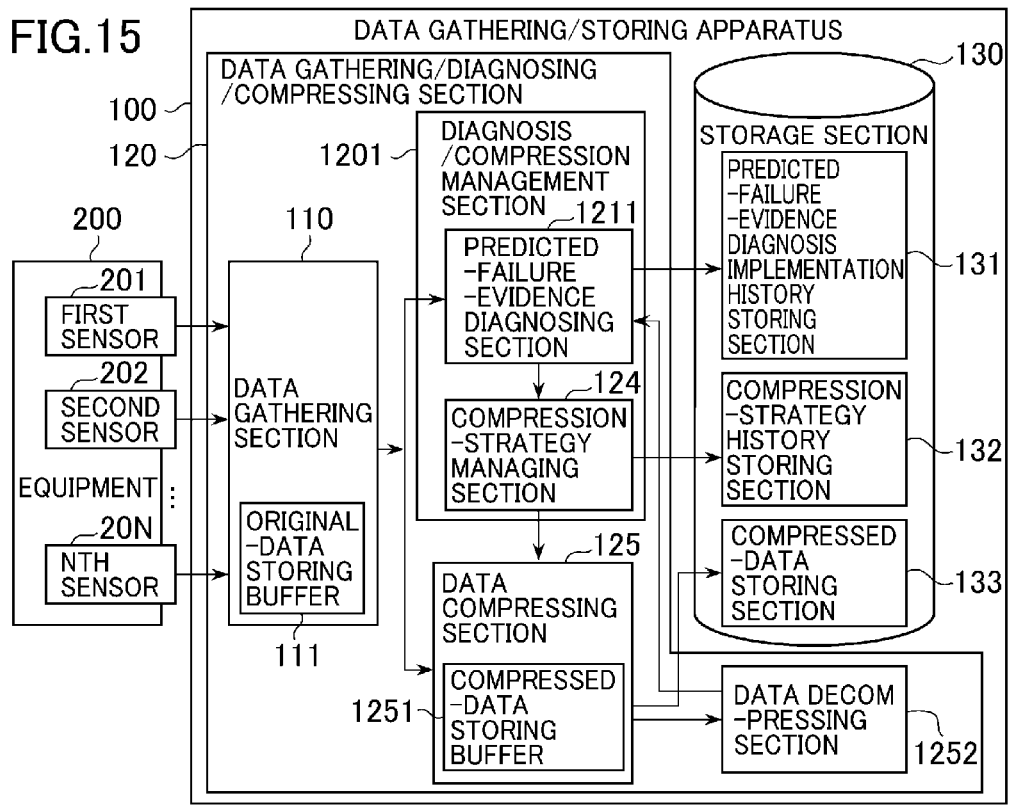
FIG. 15 is a diagram showing a configuration of a data gathering/storing apparatus for assuring the precision of a diagnosis for an evidence of a predicted abnormality in accordance with a second embodiment.
Figure 16:
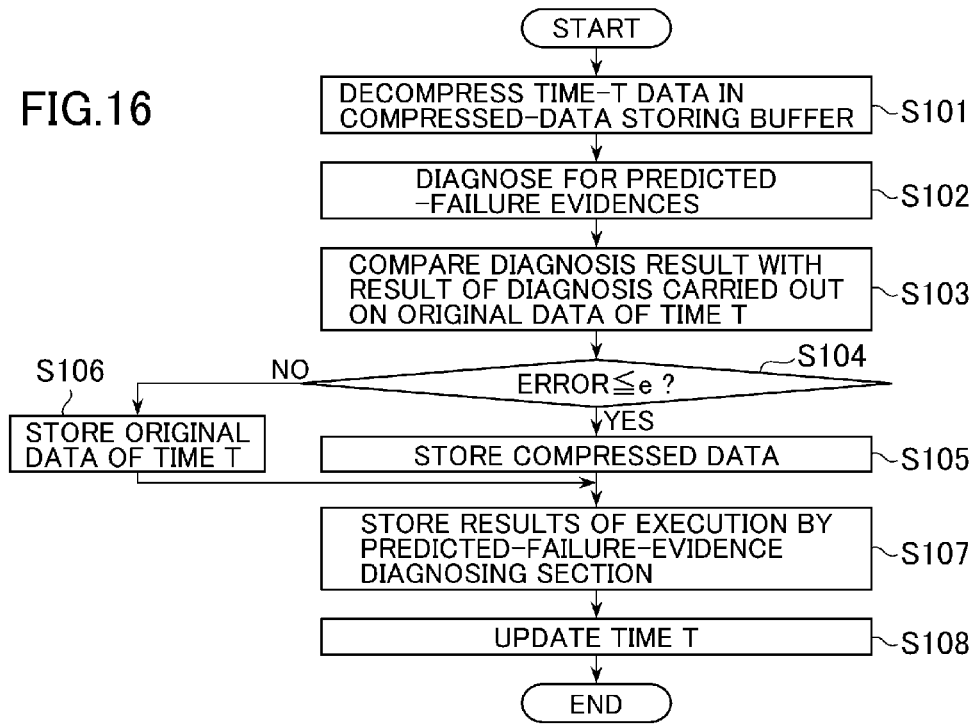
FIG. 16 shows a flowchart of operations carried out by a diagnosis/compression management section according to the second embodiment.

FIG. 15 is a diagram showing a configuration of a data gathering/storing apparatus for assuring the precision of a diagnosis for an evidence of a predicted abnormality in accordance with a second embodiment. It is to be noted that, in the course of the following description, FIG. 16 is referred to.

A data gathering/storing apparatus 100 according to the second embodiment is explained by referring to FIG. 15 as follows.

As shown in FIG. 15, the data gathering/storing apparatus 100 is configured to employ a data gathering/diagnosing/compressing section 120 and a storage section 130.

The data gathering/diagnosing/compressing section 120 is configured to employ a data gathering section 110, a diagnosis/compression management section 1201, a data compressing section 125 and a data decompressing section 1252.

The data gathering section 110 has an original-data storing buffer 111. The diagnosis/compression management section 1201 is configured to employ a predicted-failure-evidence diagnosing section 1211 and a compression-strategy managing section 124.

The data compressing section 125 has a compressed-data storing buffer 1251.

The storage section 130 is configured to employ a predicted-failure-evidence diagnosis implementation history storing section 131, a compression-strategy history storing section 132 and a compressed-data storing section 133.

Meanwhile, equipment 200 includes a first sensor, a second sensor, - - - and an nth sensor which are denoted by reference numerals 201, 202, - - - and 20n respectively where the character n in reference notation 20n is a positive integer. Time-series sensing information group detected by these sensors is supplied to the data gathering/storing apparatus 100 as input data.

The data gathering section 110 gathers the time-series input data received from the first sensor 201, the second sensor 202, - - - and the nth sensor 20n and stores the input data in the original-data storing buffer 111. The input data stored in the original-data storing buffer 111 is sequentially delivered to the predicted-failure-evidence diagnosing section 1211 and the data compressing section 125.

In the predicted-failure-evidence diagnosing section 1211, the input data is diagnosed for an evidence of a predicted abnormality. A result of the diagnosis is supplied to the compression-strategy managing section 124. On the basis of the diagnosis result received from the predicted-failure-evidence diagnosing section 1211, the compression-strategy managing section 124 sets a compression strategy for the data compressing section 125.

On the other hand, the data compressing section 125 compresses the input data received from the data gathering section 110 in accordance with the compression strategy set by the compression-strategy managing section 124 and temporarily stores the compressed data in the compressed-data storing buffer 1251.

In accordance with the compression strategy set by the compression-strategy managing section 124, data stored in the compressed-data storing section 133 can be the compressed data stored in the compressed-data storing buffer 1251 or the uncompressed original data stored in the original-data storing buffer 111.

FIG. 16 shows a flowchart of operations carried out by the diagnosis/compression management section according to the second embodiment.

To be more specific, the operations shown in FIG. 16 are carried out by the data compressing section 125, the data decompressing section 1252 and the predicted-failure-evidence diagnosing section 1211 as follows.

At a step S101 of the flowchart, the compressed data stored in the compressed-data storing buffer 1251 is decompressed by the data decompressing section 1252 which then sequentially supplies the decompressed data to the predicted-failure-evidence diagnosing section 1211.

The compressed data is decompressed by typically carrying out linear approximation making use of data at both ends of a thinned segment. Then, at the next step S102, the predicted-failure-evidence diagnosing section 1211 diagnoses the decompressed data for an evidence of a predicted abnormality.

Subsequently, at the next step S103, a result of the diagnosis is compared with a result of a diagnosis carried out on the original data of the same time.

Then, at the next step S104, the results of the two diagnoses are compared.

If the result of the comparison indicates that an error is not greater than a threshold value e set separately, the flowchart continues to a step S105 at which the predicted-failure-evidence diagnosing section 1211 requests the data compressing section 125 to transfer the compressed data stored in the compressed-data storing buffer 1251 to the compressed-data storing section 133.

On the other hand, if the result of the comparison indicates that the error is greater than the threshold value e, the flowchart continues to a step S106 at which the predicted-failure-evidence diagnosing section e 1211 requests the data compressing section 125 to transfer the original data of the same time from the original-data storing buffer 111 to the compressed-data storing section 133.

Then, at the next step S107, the output of the predicted-failure-evidence diagnosing section 1211 is stored in the predicted-failure-evidence diagnosis implementation history storing section 131.

Subsequently, at the next step S108, the decompressed data of the next time is used.

The operations described above are carried out repeatedly.

In addition, an allowable error output by the compression-strategy managing section 124 is stored in the compression-strategy history storing section 132.

As shown in FIG. 15, the input data supplied to the data gathering/storing apparatus 100 from the single equipment 200 as described above is information generated by the sensors 201, 202, - - - and 20n included in the equipment 200. It is to be noted, however, that the equipment may also be configured from a plurality of pieces of equipment. In addition, the information serving as the input data can also be information other than information generated by the main unit of the equipment 200 or various kinds of logging data. An example of the information other than the information generated by the main unit of the equipment 200 is sensing information of peripheral equipment or a pipe arrangement section whereas an example of the logging data is sensing information of surrounding-environment information. In addition, the information serving as the input data can also be process data or event data. On top of that, the input data does not have to be information generated by sensors. For example, the input data can also be information output by other monitoring control apparatus.

FIG. 17 is a diagram showing a configuration of the section used for storing a history of predicted-abnormality-evidence diagnosis implementation carried out in accordance with the second embodiment.

The second embodiment of the predicted-failure-evidence diagnosis implementation history storing section 131 is explained by referring to FIG. 17 as follows.

The predicted-failure-evidence diagnosis implementation history storing section 131 is used for storing sets each including an original-data equipment abnormality degree, original-data abnormality contribution degrees of every sensor, a compressed-data equipment abnormality degree, compressed-data abnormality contribution degrees of every sensor, an error and a measurement time. The original-data equipment abnormality degree and the original-data abnormality contribution degrees are a result of a diagnosis carried out by the predicted-failure-evidence diagnosing section 1211 on the time-series sensing information serving as the input data. The compressed-data equipment abnormality degree and the compressed-data abnormality contribution degrees are a result of a diagnosis carried out by the predicted-failure-evidence diagnosing section 1211 on the data decompressed by the data decompressing section 1252. The error is the difference between the original-data equipment abnormality degree and the compressed-data equipment abnormality degree.

That is to say, every set includes a measurement time $t_i$, an equipment abnormality degree error $e_i$, an equipment abnormality degree $d_i$ obtained for input data, an equipment abnormality degree $d_i'$ obtained for decompressed data, an abnormality contribution degree $r1_i$ of the first sensor obtained for input data, an abnormality contribution degree $r1_i'$ of the first sensor obtained for decompressed data, an abnormality contribution degree $r2_i$ of the second sensor obtained for input data, an abnormality contribution degree $r2_i'$ of the second sensor obtained for decompressed data, - - - , an abnormality contribution degree $rn_i$ of the nth sensor obtained for input data and an abnormality contribution degree $rn_i'$ of the nth sensor obtained for decompressed data where suffix i is an integer in a range of 0 to m. The sets are stored in the predicted-failure-evidence diagnosis implementation history storing section 131 in a time-series format.

The buffer is configured as typically a ring buffer. As the ring buffer becomes full of the equipment abnormality and abnormality contribution degrees stored therein, new equipment abnormality and abnormality contribution degrees are stored in the buffer sequentially over the least recent equipment abnormality and abnormality contribution degrees.

<Effects and Restriction Avoidance>

As described above, at a time for which the error is equal to or smaller than the threshold value, compressed data is stored in the predicted-failure-evidence diagnosis implementation history storing section 131. On the other hand, at a time for which the error is greater than the threshold value, original data is stored in the predicted-failure-evidence diagnosis implementation history storing section 131. That is to say, in this case, there is no diagnosis error. Thus, for all data stored in the predicted-failure-evidence diagnosis implementation history storing section 131, it can be assured that the error of the diagnosis for an evidence of a predicted abnormality is equal to or smaller than the threshold value.

It is to be noted that each set stored in the predicted-failure-evidence diagnosis implementation history storing section 131 may also consist of only a measurement time, an equipment abnormality degree error and equipment abnormality degrees.

Third Embodiment

The following description explains an embodiment in which data is compressed after being stored temporarily.

FIG. 18 is a diagram showing a configuration of a data gathering/storing apparatus for carrying out data compression after data storing in accordance with a third embodiment. A data gathering/storing apparatus 100 according to the third embodiment is explained by referring to FIG. 18 as follows.

As shown in FIG. 18, the data gathering/storing apparatus 100 is configured to employ a data gathering/diagnosing/compressing section 120 and a storage section 130.

The data gathering/diagnosing/compressing section 120 is configured to employ a data gathering section 110, a diagnosis/compression management section 1201 and a data compressing section 125. The diagnosis/compression management section 1201 is configured to include a predicted-failure-evidence diagnosing section 121 and a compression-strategy managing section 124.

The storage section 130 is configured to employ a predicted-failure-evidence diagnosis implementation history storing section 131, a compression-strategy history storing section 132, a compressed-data storing section 133 and an original-data storing section 134.

Meanwhile, equipment 200 includes a first sensor, a second sensor, - - - and an nth sensor which are denoted by reference numerals 201, 202, - - - and 20n respectively where the character n in reference notation 20n is a positive integer. Time-series sensing information group detected by these sensors is supplied to the data gathering/storing apparatus 100 as input data.

The data gathering section 110 gathers the time-series input data received from the first sensor 201, the second sensor 202, - - - and the nth sensor 20n, sequentially supplying the data to the predicted-failure-evidence diagnosing section 121 and the original-data storing section 134.

The predicted-failure-evidence diagnosing section 121 diagnoses the input data received from the data gathering section 110 for an evidence of a predicted abnormality and outputs the result of the diagnosis to the compression-strategy managing section 124. On the basis of the diagnosis result received from the predicted-failure-evidence diagnosing section 121, the compression-strategy managing section 124 sets a compression strategy for the data compressing section 125.

On the other hand, the data compressing section 125 sequentially fetches the input data stored in the original-data storing section 134 in accordance with the compression strategy set by the compression-strategy managing section 124 and receives the compression strategy from the compression-strategy managing section 124 for the time at which the input data fetched from the original-data storing section 134 is gathered. Then, the data compressing section 125 compresses the input data in accordance with the compression strategy and stores the compressed data or the uncompressed original data in the compressed-data storing section 133.

In addition, the diagnosis result output by the predicted-failure-evidence diagnosing section 121 is stored in the predicted-failure-evidence diagnosis implementation history storing section 131 whereas the allowable error output by the compression-strategy managing section 124 is stored in the compression-strategy history storing section 132.

A timing with which the data compressing section 125 fetches the input data from the original-data storing section 134 as described above can be set at a point of time lagging behind a time, at which the input data is stored in the original-data storing section 134, by a certain period of time. As an alternative, the timing can also be set at a point of time at which the size of an available area in the original-data storing section 134 becomes equal to or smaller than a threshold value. As an alternative, the timing can also be set at a point of time at which a detailed diagnosis like one explained by referring to FIG. 19 or 20 to be described later is carried out.

When the input data is stored in the original-data storing section 134, lossless compression may be carried out. When the input data is fetched from the original-data storing section 134, lossless decompression may be carried out. Thus, data to be stored in the original-data storing section 134 may be compressed.

In FIG. 18, the input data supplied to the data gathering/storing apparatus 100 from the single equipment 200 as described above is information generated by the sensors 201, 202, - - - and 20n included in the equipment 200. It is to be noted, however, that the equipment may also be configured from a plurality of pieces of equipment. In addition, the information serving as the input data can also be information other than information generated by the main unit of the equipment 200 or various kinds of logging data. An example of the information other than the information generated by the main unit of the equipment 200 is sensing information of peripheral equipment or a pipe arrangement section whereas an example of the logging data is sensing information of surrounding-environment information. In addition, the information serving as the input data can also be process data or event data. On top of that, the input data does not have to be information generated by sensors. For example, the input data can also be information output by other monitoring control apparatus.

It is to be noted that a section for assuring the precision of a diagnosis for an evidence of a predicted abnormality in accordance with the second embodiment described earlier can be used as a data gathering-diagnosing-compressing section employed in the third embodiment in which gathered data is compressed after the gathered data has been stored.

Fourth Embodiment

An embodiment implementing a server-based system is explained as follows.

Figure 19:
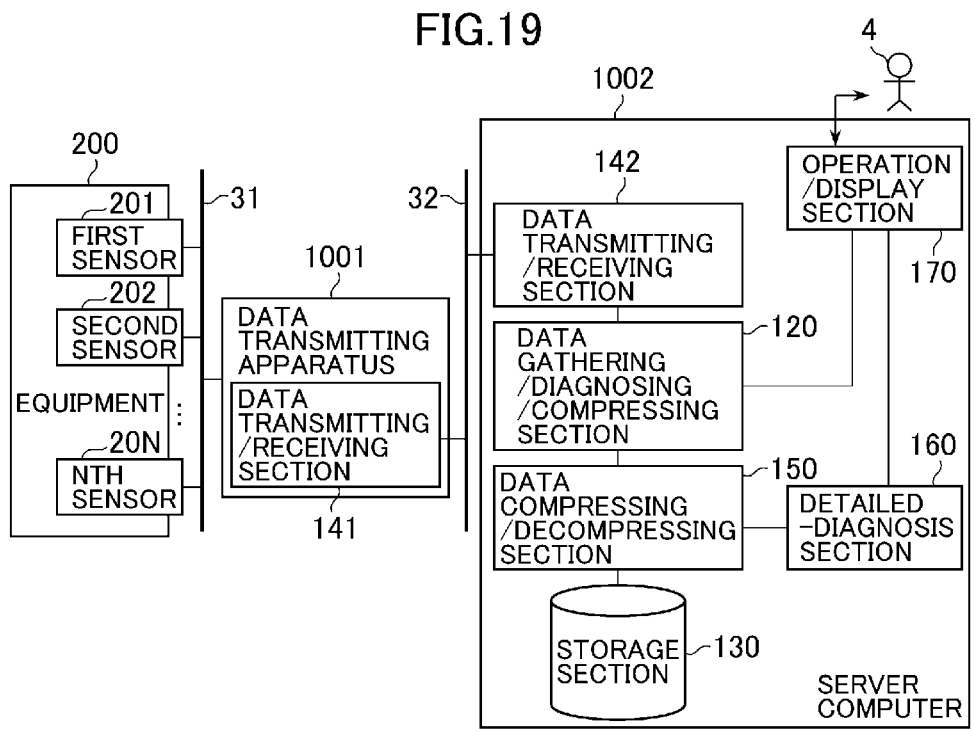
FIG. 19 is a diagram showing first typical application of a data gathering/storing apparatus to a system in accordance with a fourth embodiment.

FIG. 19 is a diagram showing first typical application of a data gathering/storing apparatus to the server-based system in accordance with a fourth embodiment. The first typical application of the data gathering/storing apparatus to the server-based system is explained by referring to FIG. 19 as follows.

As shown in FIG. 19, equipment 200 includes a first sensor, a second sensor, - - - and an nth sensor which are denoted by reference numerals 201, 202, - - - and 20n respectively where the character n in reference notation 20n is a positive integer. The equipment 200 is connected to a data transmitting apparatus 1001 by a network 31. In addition, the data transmitting apparatus 1001 is connected to a server computer 1002 by a network 32.

The data transmitting apparatus 1001 has a data transmitting/receiving section 141.

On the other hand, the server computer 1002 includes a data transmitting/receiving section 142, a data gathering/diagnosing/compressing section 120, a data compressing/decompressing section 150, a storage section 130, a detailed-diagnosis section 160 and an operation/display section 170.

Time-series sensing information group detected by the sensors employed in the equipment 200 is transmitted to the data transmitting apparatus 1001 as input data through the network 31.

The data transmitting apparatus 1001 then transmits the input data received from the equipment 200 to the server computer 1002 through the network 32.

The network 31 is typically a field network used for monitoring and controlling equipment. For example, the network 31 is a wire network such as CAN or Lonworks. As an alternative, the network 31 is a wireless network such as Zig Bee or ISA100.11a. As another alternative, the network 31 is configured from these networks coexisting together. However, the network 31 can also be configured from any other network. Instead of making use of the network 31 between the sensors and the data transmitting apparatus 1001, each of the sensors can also be connected to the data transmitting apparatus 1001 on a 1-to-1 basis.

On the other hand, the network 32 can be any one of the networks described above, a high-speed network such as the Ethernet (a registered trademark) or an optical-fiber network, a WiFi base radio network such as the IEEE802.11a/g/b/n, a radio mesh network such as the IEEE802.11s, the Internet, a dedicated line, a public radio network, a mobile-phone network or a landline-phone network or can be configured from these networks coexisting together. However, the network 32 can also be configured from any other network.

In order to transmit data through the network 32, the data transmitting apparatus 1001 is provided with the data transmitting/receiving section 141 whereas the server computer 1002 is provided the data transmitting/receiving section 142.

Each of the data transmitting/receiving sections 141 and 142 is configured from a modem or a network module.

In the server computer 1002, the input data received by the data transmitting/receiving section 142 is supplied to the data gathering/diagnosing/compressing section 120. The data gathering/diagnosing/compressing section 120 carries out the operations explained earlier in the descriptions of the first, second or third embodiment in order to gather the input data, diagnose the data for an evidence of a predicted abnormality and compress the data.

The data compressed by the data gathering/diagnosing/compressing section 120 is further compressed by the data compressing/decompressing section 150 before being stored in the storage section 130.

The detailed-diagnosis section 160 receives the data stored in the storage section 130 through the data compressing/decompressing section 150 and carries out a detailed diagnosis on the data. In this case, the detailed diagnosis is carried out by executing clustering based on vector quantization and setting the dimension of the input-data vector as well as the total number of clusters created at a learning time at large values. As an alternative, it is also possible to adopt a technique other than the vector quantization, another multi-variable analysis technique such as the MT technique or a diagnosis method making use of results of simulation of the equipment.

The data compressing/decompressing section 150 carries out lossless compression/decompression. Thus, the amount of data stored in the storage section 130 can be further reduced.

It is to be noted that the data compressing/decompressing section 150 can be eliminated from the server computer 1002. In addition, the detailed-diagnosis section 160 can also be eliminated from the server computer 1002.

A user 4 operates the operation/display section 170 in order to verify results of diagnoses of data and change a variety of parameters. That is to say, since the operation/display section 170 receives information such as results of diagnoses, a compression strategy and compressed data from the data gathering/diagnosing/compressing section 120, the user 4 can operate the operation/display section 170 in order to verify the information. Then, in accordance with results of the verification, the user 4 can update learning data for diagnoses carried out by the data gathering/diagnosing/compressing section 120 and change the compression strategy. The compression strategy is changed typically by modifying the allowable error.

By the same token, the operation/display section 170 also receives results of detailed diagnoses from the detailed-diagnosis section 160. Thus, the user 4 can operate the operation/display section 170 in order to verify the results of the detailed diagnoses. Then, in accordance with results of the verification, the user 4 can update learning data for the detailed diagnoses carried out by the detailed-diagnosis section 160 and change a diagnosis algorithm adopted in the detailed diagnoses.

It is to be noted that the operation to compress gathered data after the gathered data has been stored in the storage section 130 in accordance with the third embodiment explained earlier can be carried out in the fourth embodiment. This operation can be carried out in accordance with results of detailed diagnoses executed by the detailed-diagnosis section 160. If the results of the detailed diagnoses are normal for example, the data is compressed. On the other hand, if the results of the detailed diagnoses indicate that an evidence of a predicted abnormality has been detected, the data is not compressed. As an alternative, the user 4 operates the operation/display section 170 in order to verify the results of diagnoses carried out by the data gathering/diagnosing/compressing section 120 or the results of detailed diagnoses carried out by the detailed-diagnosis section 160. Then, in accordance with results of the verification, the user 4 can make a request for compression of the data.

The input data supplied to the data gathering/storing apparatus 100 from the single equipment 200 as described above is information generated by the sensors 201, 202, - - - and 20n included in the equipment 200. It is to be noted, however, that the equipment may also be configured from a plurality of pieces of equipment. In addition, the information serving as the input data can also be information other than information generated by the main unit of the equipment 200 or various kinds of logging data. An example of the information other than the information generated by the main unit of the equipment 200 is sensing information of peripheral equipment or a pipe arrangement section whereas an example of the logging data is sensing information of surrounding-environment information. In addition, the information serving as the input data can also be process data or event data. On top of that, the input data does not have to be information generated by sensors. For example, the input data can also be information output by other monitoring control apparatus.

Fifth Embodiment

Next, the following description explains an embodiment implementing a distributed system for carrying out operations of a data gathering apparatus, operations to transmit compressed data and operations to store the data in a server.

Figure 20:
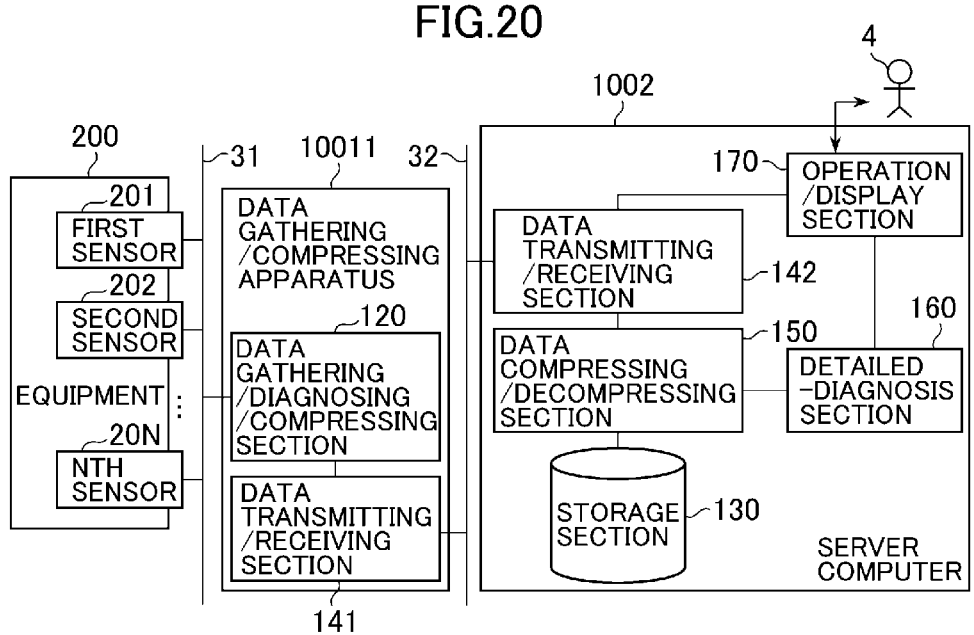
FIG. 20 is a diagram showing second typical application of a data gathering/storing apparatus to a system in accordance with a fifth embodiment.

FIG. 20 is a diagram showing second typical application of a data gathering/storing apparatus to a system in accordance with a fifth embodiment. The second typical application of the data gathering/storing apparatus to the system is explained by referring to FIG. 20 as follows.

As shown in FIG. 20, equipment 200 includes a first sensor, a second sensor, - - - and an nth sensor which are denoted by reference numerals 201, 202, - - - and 20n respectively where the character n in reference notation 20n is a positive integer. The equipment 200 is connected to a data gathering/compressing apparatus 10011 by a network 31.

In addition, the data gathering/compressing apparatus 10011 is connected to a server computer 1002 by a network 32. The data gathering/compressing apparatus 10011 has a data gathering/diagnosing/compressing section 120 and a data transmitting/receiving section 141. On the other hand, the server computer 1002 includes a data transmitting/receiving section 142, a data compressing/decompressing section 150, a storage section 130, a detailed-diagnosis section 160 and an operation/display section 170.

Time-series sensing information group detected by the sensors employed in the equipment 200 is transmitted to the data gathering/compressing apparatus 10011 as input data through the network 31.

In the data gathering/compressing apparatus 10011, the input data received from the network 31 is supplied to the data gathering/diagnosing/compressing section 120. The data gathering/diagnosing/compressing section 120 carries out the operations explained earlier in the descriptions of the first, second or third embodiment in order to gather the input data, diagnose the data for an evidence of a predicted abnormality and compress the data.

The data compressed by the data gathering/diagnosing/compressing section 120 is supplied to the data transmitting/receiving section 141 and then transmitted to the server computer 1002 through the network 32.

The network 31 is typically a field network used for monitoring and controlling equipment. For example, the network 31 is a wire network such as CAN or Lonworks. As an alternative, the network 31 is a wireless network such as Zig Bee or ISA100.11a. As another alternative, the network 31 is configured from these networks coexisting together. However, the network 31 can also be configured from any other network. Instead of making use of the network 31 between the sensors and the data transmitting apparatus 1001, each of the sensors can also be connected to the data transmitting apparatus 1001 on a 1-to-1 basis.

On the other hand, the network 32 can be any one of the networks described above, a high-speed network such as the Ethernet (a registered trademark) or an optical-fiber network, a WiFi base radio network such as the IEEE802.11a/g/b/n, a radio mesh network such as the IEEE802.11s, the Internet, a dedicated line, a public radio network, a mobile-phone network or a landline-phone network or can be configured from these networks coexisting together. However, the network 32 can also be configured from any other network.

In order to transmit data through the network 32, the data transmitting apparatus 1001 is provided with the data transmitting/receiving section 141 whereas the server computer 1002 is provided the data transmitting/receiving section 142.

Each of the data transmitting/receiving sections 141 and 142 is configured from a modem or a network module.

In the server computer 1002, the compressed data received by the data transmitting/receiving section 142 is supplied to the data compressing/decompressing section 150 for further compressing the data before storing the data in the storage section 130.

The detailed-diagnosis section 160 receives the data stored in the storage section 130 through the data compressing/decompressing section 150 and carries out a detailed diagnosis on the data. In this case, the detailed diagnosis is carried out by executing clustering based on vector quantization and setting the dimension of the input data vector as well as the total number of clusters created at a learning time at large values. As an alternative, it is also possible to adopt a technique other than the vector quantization, another multi-variable analysis technique such as the MT technique or a diagnosis method making use of results of simulation of the equipment.

The data compressing/decompressing section 150 carries out lossless compression/decompression. Thus, the amount of data stored in the storage section 130 can be further reduced. It is to be noted that the data compressing/decompressing section 150 can be eliminated from the server computer 1002. In addition, the detailed-diagnosis section 160 can also be eliminated from the server computer 1002.

A user 4 operates the operation/display section 170 in order to verify results of diagnoses of data and change a variety of parameters.

That is to say, since the operation/display section 170 receives information such as results of diagnoses, a compression strategy and compressed data from the data gathering/diagnosing/compressing section 120 through the network 32 and the data transmitting/receiving section 142, the user 4 can operate the operation/display section 170 in order to verify the information. Then, in accordance with results of the verification, the user 4 can update learning data for diagnoses carried out by the data gathering/diagnosing/compressing section 120 and change the compression strategy. The compression strategy is changed typically by modifying the allowable error.

By the same token, the operation/display section 170 also receives results of detailed diagnoses from the detailed-diagnosis section 160. Thus, the user 4 can operate the operation/display section 170 in order to verify the results of the detailed diagnoses. Then, in accordance with results of the verification, the user 4 can update learning data for detailed diagnoses carried out by the detailed-diagnosis section 160 and change a diagnosis algorithm adopted in the diagnoses.

It is to be noted that the operation to compress gathered data after the gathered data has been stored in the storage section 130 in accordance with the third embodiment explained earlier can also be carried out in the fifth embodiment. This operation can be carried out in accordance with results of detailed diagnoses executed by the detailed-diagnosis section 160. If the results of the detailed diagnoses are normal for example, the data is compressed. On the other hand, if the results of the detailed diagnoses indicate that an evidence of a predicted abnormality has been detected, the data is not compressed. As an alternative, the user 4 operates the operation/display section 170 in order to verify the results of diagnoses carried out by the data gathering/diagnosing/compressing section 120 or the results of detailed diagnoses carried out by the detailed-diagnosis section 160. Then, in accordance with results of the verification, the user 4 can make a request for compression of the data.

In accordance with the fifth embodiment, the amount of data transmitted through the network 32 is small in comparison with the fourth embodiment described earlier. Thus, the fifth embodiment is effective for transmission speeds which are not so high in the case of a radio network or a phone line used as the network 32.

The input data supplied to the data gathering/storing apparatus 100 from the single equipment 200 shown in the figure is information generated by the sensors 201, 202, - - - and 20$n$ included in the equipment 200. It is to be noted, however, that the equipment may also be configured from a plurality of pieces of equipment. In addition, the information serving as the input data can also be information other than information generated by the main unit of the equipment 200 or various kinds of logging data. An example of the information other than the information generated by the main unit of the equipment 200 is sensing information of peripheral equipment or a pipe arrangement section whereas an example of the logging data is sensing information of surrounding-environment information. In addition, the information serving as the input data can also be process data or event data. On top of that, the input data does not have to be information generated by sensors. For example, the input data can also be information output by other monitoring control apparatus.

Sixth Embodiment

Next, the following description explains an embodiment applied to a heavy machine as a first application.

Figure 21:
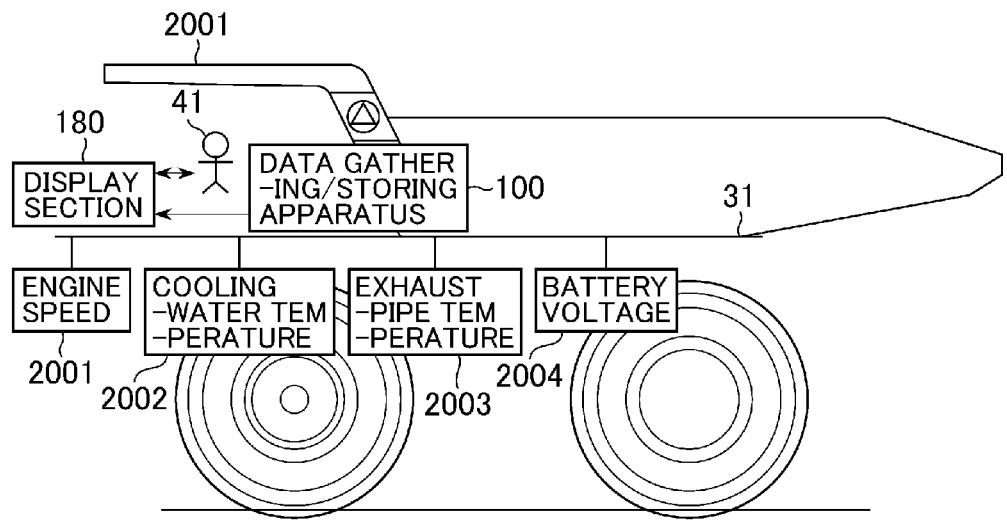
FIG. 21 is a diagram showing first typical application of a data gathering/storing apparatus to a heavy machine in accordance with a sixth embodiment.

FIG. 21 is a diagram showing typical application of a data gathering/storing apparatus to a heavy machine in accordance with a sixth embodiment.

That is to say, typical application of a data gathering/storing apparatus 100 to a heavy machine is shown in FIG. 21. The figure shows typical application of the data gathering/storing apparatus 100 to a dump having a large size. As shown in the figure, a large-size dump 2001 has an engine-speed measuring sensor 201, a cooling-water temperature measuring sensor 202, an exhaust-pipe temperature measuring sensor 203 and a battery-voltage measuring sensor 204 which are connected to the data gathering/storing apparatus 100 by a network 31.

In addition, the data gathering/storing apparatus 100 displays results of diagnoses on a display section 180 in order to notify an operator 41 of the diagnosis results. Notified of the diagnosis results displayed on the display section 180, the operator 41 verifies the diagnosis results in order to determine whether an operation is to be continued or stopped.

Figure 22:
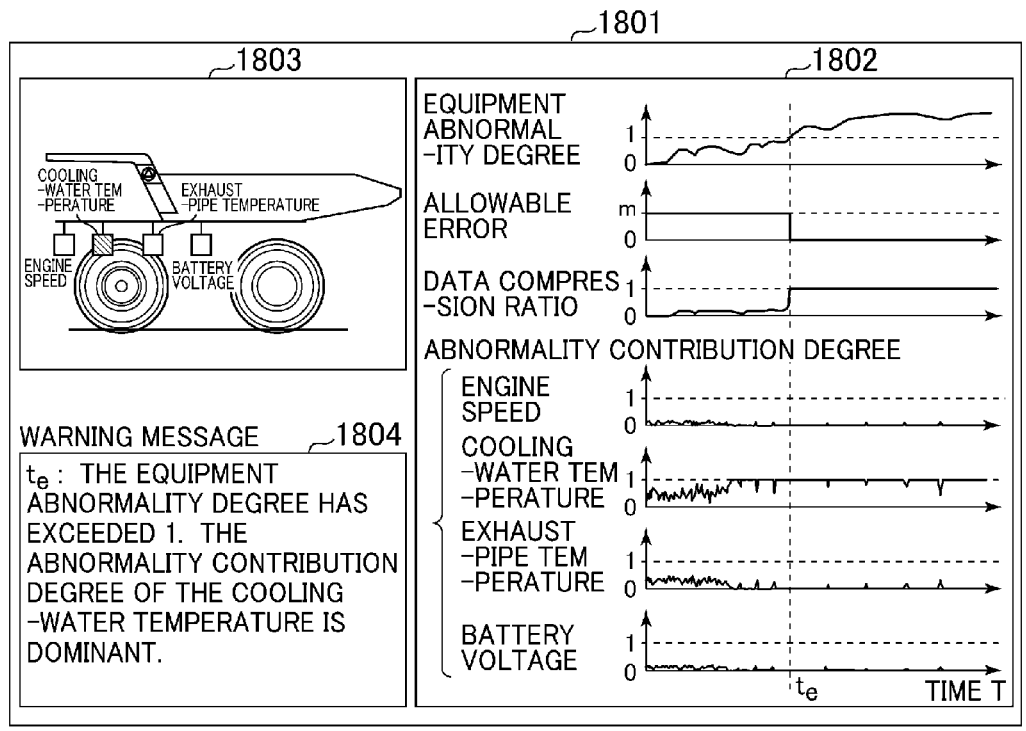
FIG. 22 is a diagram showing a configuration of the screen of a display section.

FIG. 22 is a diagram showing a typical configuration of the screen of the display section 180.

That is to say, a typical configuration of the screen of the display section 180 is shown in FIG. 22 and is application to the large-size dump 2001 shown in FIG. 21. An entire screen 1801 shown in FIG. 22 is configured to include a time-axis graph displaying screen 1802, an abnormal-sensor displaying screen 1803 and a warning-message log displaying screen 1804 used for displaying warning messages.

The time-axis graph displaying screen 1802 displays quantity changes with the lapse of time. The quantity changes are changes of the equipment abnormality degree, the allowable error, the data compression ratio and the abnormality contribution degrees of sensors. In the case of the entire screen 1801 shown in the figure, the sensors are the engine-speed measuring sensor 201, the cooling-water temperature measuring sensor 202, the exhaust-pipe temperature measuring sensor 203 and the battery-voltage measuring sensor 204.

As shown in FIG. 6, the allowable error is set as follows:

For the equipment abnormality degree≤1 (that is, in a normal period of time), the allowable error is set at m.

For the equipment abnormality degree>1 (that is, in a predicted-abnormality-evidence detection period of time), on the other hand, the allowable error is set at 0.

Graphs of the equipment abnormality degree and the abnormality contribution degrees of sensors represent data stored in the predicted-failure-evidence diagnosis implementation history storing section 131 shown in FIG. 12.

The compression ratio C is found typically as follows.

$$C = 1 - \Sigma(\text{sensor data size} \times \text{the number of nulls in a previous segment } T)/\Sigma(\text{sensor data size} \times \text{the number of data pieces in the previous segment } T)$$

The length of the previous segment T used in the above equation is m times of the measurement period where m is a positive integer such as 1,000.

As shown in the figure, in a period after the time te, the equipment abnormality degree is greater than 1. The figure shows an example in which the abnormality contribution degree of the temperature of cooling water is predominant.

It is to be noted that an abnormality contribution degree to be displayed for a sensor desired by the user can typically be selected by marking a check box assigned to the sensor. As an alternative, only the n largest abnormality contribution degrees are displayed where n is a positive integer such as 3. In addition, for every sensor, it is also possible to display not only a graph representing the abnormality contribution degree of the sensor, but also graphs each representing another observed value of the sensor.

The abnormal-sensor displaying screen 1803 displays a sensor with the highest abnormality contribution degree in the event of an abnormality by highlighting the display of the sensor. A sensor can be highlighted by showing the sensor typically in a color or blinking display. In the display example shown in the figure, the abnormal-sensor displaying screen 1803 highlights the abnormality contribution degree of the cooling-water temperature in the event of an abnormality.

The warning-message log displaying screen 1804 for warning messages displays a message indicating the existence of an abnormality. In the display example shown in the figure, a warning message is displayed to indicate that the abnormality contribution degree of the cooling-water temperature is dominant after an abnormality has occurred at the time te.

Seventh Embodiment

Next, the following description explains an embodiment applied to a heavy machine as a second application.

Figure 23:
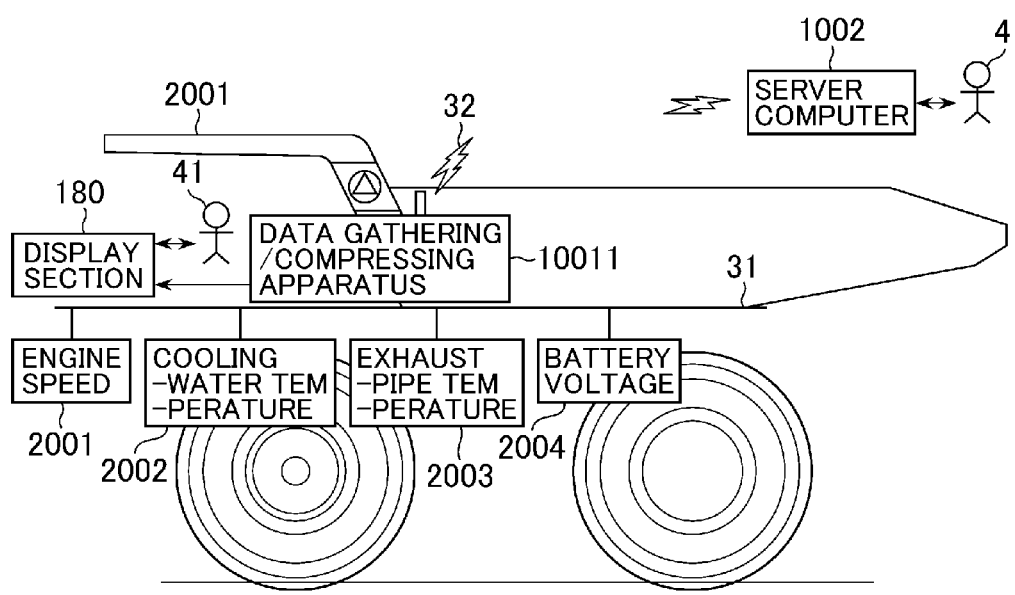
FIG. 23 is a diagram showing typical application of a data gathering/compressing apparatus to a heavy machine in accordance with a seventh embodiment.

FIG. 23 is a diagram showing typical application of a data gathering/compressing apparatus to a heavy machine in accordance with a seventh embodiment.

Typical application of a data gathering/compressing apparatus 10011 to a heavy machine is shown in FIG. 23. That is to say, FIG. 23 shows second typical application that the data gathering/compressing apparatus according to the fifth embodiment shown in FIG. 20 is applied to a system. As shown in the figure, a large-size dump 2001 has an engine-speed measuring sensor 201, a cooling-water temperature measuring sensor 202, an exhaust-pipe temperature measuring sensor 203 and a battery-voltage measuring sensor 204 which are connected to the data gathering/compressing apparatus 10011 by a network 31.

In addition, the data gathering/compressing apparatus 10011 displays results of diagnoses on a display section 180 in order to notify an operator 41 of the diagnosis results. Furthermore, the results of diagnoses are transmitted to a server computer 1002 through a network 32. The server computer 1002 carries out a detailed diagnosis on the data received from the data gathering/compressing apparatus 10011 and reports the results of the diagnosis to the operator 41 through the data gathering/compressing apparatus 10011 and the display section 180. In this way, the operator 41 can be informed of the results of the diagnosis carried out by the server computer 1002.

The screen shown in FIG. 22 can be used as a typical screen of the display section 180 and a typical screen of a display unit of the operation/display section 170 employed in the server computer 1002.

DESCRIPTION OF REFERENCE NUMERALS

4: User
31, 32: Network
41: Operator
100: Data gathering/storing apparatus
110: Data gathering section 111: Original-data storing buffer
120: Data gathering/diagnosing/compressing section
121 and 1211: Predicted-failure-evidence diagnosing section
124: Compression-strategy managing section
125: Data compressing section
130: Storage section
131: Predicted-failure-evidence diagnosis history implementation storing section
132: Compression-strategy history storing section
133: Compressed-data storing section
134: Original-data storing section
141 and 142: Data transmitting/receiving section
150: Data compressing/decompressing section
160: Detailed-diagnosis section
170: Operation/display section
180: Display section
200: Equipment
201: Engine-speed measuring sensor
202: Cooling-water temperature measuring sensor
203: Exhaust-pipe temperature measuring sensor
204: Battery-voltage measuring sensor
1001: Data transmitting apparatus
1002: Server computer
1201: Diagnosis/compression management section
1251: Compressed-data storing buffer
1252: Data decompressing section
1801: Entire screen
1802: Time-axis graph displaying screen
1803: abnormal-sensor displaying screen
1804: Warning-message log displaying screen
2001: Large-size dump
1011: Data gathering/compressing apparatus

The invention claimed is:

1. A method implemented by a computer for diagnosing and compressing a time-series data, comprising:
   carrying out a predicted abnormality evidence diagnosis on time-series data gathered from one or more sensors provided on equipment;
   managing a compression strategy for the data on the basis of a result of the diagnosis and thereby compressing the data with data compressing means;
   after compressing the time-series data with data compressing means through execution of the predicted abnormality evidence diagnosis on the data and through the management of a compression strategy for the data on the basis of a result of the diagnosis, decompressing the compressed data;
   carry out a predicted abnormality evidence diagnosis on the decompresses data;
   comparing a result of the diagnosis carried out on the decompressed data with a result of the diagnosis carried out earlier on the uncompressed data in order to find an error which is the difference between the two results; and
   storing the compressed data in a storage if the error is not greater than a reference value, or storing the uncompressed data in the storage if the error is greater than the reference value.

2. The time-series data diagnosing and compressing method according to claim 1, wherein the degree of diremption of the gathered time-series data from a cluster is used as a result of the predicted abnormality evidence diagnosis, the cluster being classified based on vector quantization by making use of a group of time-series data gathered in advance from the sensors at normal times.

3. The time-series data diagnosing and compressing method according to claim 1, wherein, in the management of a compression strategy for the data, an allowable error of the data is computed from a result of the predicted abnormality evidence diagnosis.

4. The time-series data diagnosing and compressing method according to claim 3, wherein, in the management of a compression strategy for the data, as an allowable error computed for the time-series data, the same allowable error is set for all of one or more pieces of sensor data composing the time-series data.

5. The time-series data diagnosing and compressing method according to claim 4, wherein, as allowable errors computed for the time-series data, allowable errors each computed independently for one of the sensors are set for one or more pieces of sensor data composing the time-series data.

6. The time-series data diagnosing and compressing method according to claim 3, wherein, in the management of a compression strategy for the data, an output allowable error of the data is stored in a storage.

7. The time-series data diagnosing and compressing method according to claim 1, wherein the data compressing means carries out irreversible data compression of thinning data satisfying a specified allowable-error range and of leaving data departed from an allowable error.

8. The time-series data diagnosing and compressing method according to claim 7, wherein the data compressing means carries out multi-stage compression by further executing reversible compression after execution of the irreversible data compression.

* * * * *